(12) United States Patent
Iida et al.

(10) Patent No.: US 8,827,306 B2
(45) Date of Patent: Sep. 9, 2014

(54) AIRBAG APPARATUS

(71) Applicant: Toyoda Gosei Co., Ltd., Kiyosu (JP)

(72) Inventors: Hitoshi Iida, Kiyosu (JP); Tsutomu Ishii, Kiyosu (JP); Norio Umemura, Kiyosu (JP); Kosuke Shigeta, Kosuke (JP); Mikine Hayashi, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/803,381

(22) Filed: Mar. 14, 2013

(65) Prior Publication Data

US 2013/0257024 A1 Oct. 3, 2013

(30) Foreign Application Priority Data

Mar. 29, 2012 (JP) ................. 2012-077047

(51) Int. Cl.
 *B60R 21/203* (2006.01)
 *B62D 7/22* (2006.01)
(52) U.S. Cl.
 CPC ......... *B60R 21/2035* (2013.01); *B60R 21/2037* (2013.01); *B62D 7/222* (2013.01)
 USPC ...................... 280/728.2; 280/731
(58) Field of Classification Search
 CPC B06R 21/2035; B06R 21/203; B06R 21/217; B06R 21/2037; B62D 7/222
 USPC .............................. 280/728.2, 731
 See application file for complete search history.

(56) References Cited

U.S. PATENT DOCUMENTS

| | | | | |
|---|---|---|---|---|
| 4,068,862 A | * | 1/1978 | Ishi et al. ...................... | 280/740 |
| 6,149,192 A | * | 11/2000 | Swann et al. ................. | 280/740 |
| 6,328,332 B1 | * | 12/2001 | Schutz ........................ | 280/728.2 |
| 6,439,599 B1 | * | 8/2002 | Laue et al. ..................... | 280/731 |
| 7,264,097 B2 | * | 9/2007 | Yasumoto et al. ............ | 188/379 |
| 7,584,986 B2 | * | 9/2009 | Laue .......................... | 280/728.2 |
| 7,874,575 B2 | * | 1/2011 | Fukuyama et al. ......... | 280/728.2 |
| 7,926,837 B2 | * | 4/2011 | Harvey et al. ............. | 280/728.2 |
| 8,052,167 B2 | * | 11/2011 | Lisseman et al. .......... | 280/728.2 |
| 8,286,766 B2 | * | 10/2012 | Terada et al. ................. | 188/379 |
| 8,567,818 B2 | * | 10/2013 | Umemura et al. ............ | 280/731 |
| 2003/0080542 A1 | * | 5/2003 | Grosch et al. ................. | 280/731 |
| 2003/0214119 A1 | * | 11/2003 | Grossmann et al. ....... | 280/728.2 |
| 2005/0093279 A1 | * | 5/2005 | Hauer et al. ................. | 280/740 |
| 2006/0061068 A1 | * | 3/2006 | Nash et al. ................. | 280/728.2 |
| 2009/0045607 A1 | * | 2/2009 | Fukuyama et al. ........ | 280/728.2 |
| 2013/0069350 A1 | * | 3/2013 | Umemura et al. ............ | 280/731 |
| 2013/0255435 A1 | * | 10/2013 | Umemura et al. ............. | 74/552 |
| 2013/0257024 A1 | * | 10/2013 | Iida et al. ................... | 280/728.2 |

FOREIGN PATENT DOCUMENTS

JP 2009-196466 A 9/2009

* cited by examiner

*Primary Examiner* — Karen Beck
(74) *Attorney, Agent, or Firm* — Posz Law Group, PLC

(57) ABSTRACT

An airbag apparatus, which is incorporated in a steering wheel, includes a bag holder in the longitudinal direction of the steering wheel. An inflator is elastically supported by the bag holder with elastic support portions. A retainer includes an annular bag attachment portion. The retainer is fastened to the bag holder such that the periphery of the airbag opening is held between the bag attachment portion and the bag holder. The retainer further includes arch portions and bag encompassing portions. The arch portions extend rearward in the longitudinal direction of the steering wheel from the inner rim of the bag attachment portion, and surround the inflator. The bag encompassing portions extend inward in a radial direction of the steering shaft from the inner rim of the bag attachment portion, and encompass the periphery of the airbag opening.

2 Claims, 15 Drawing Sheets

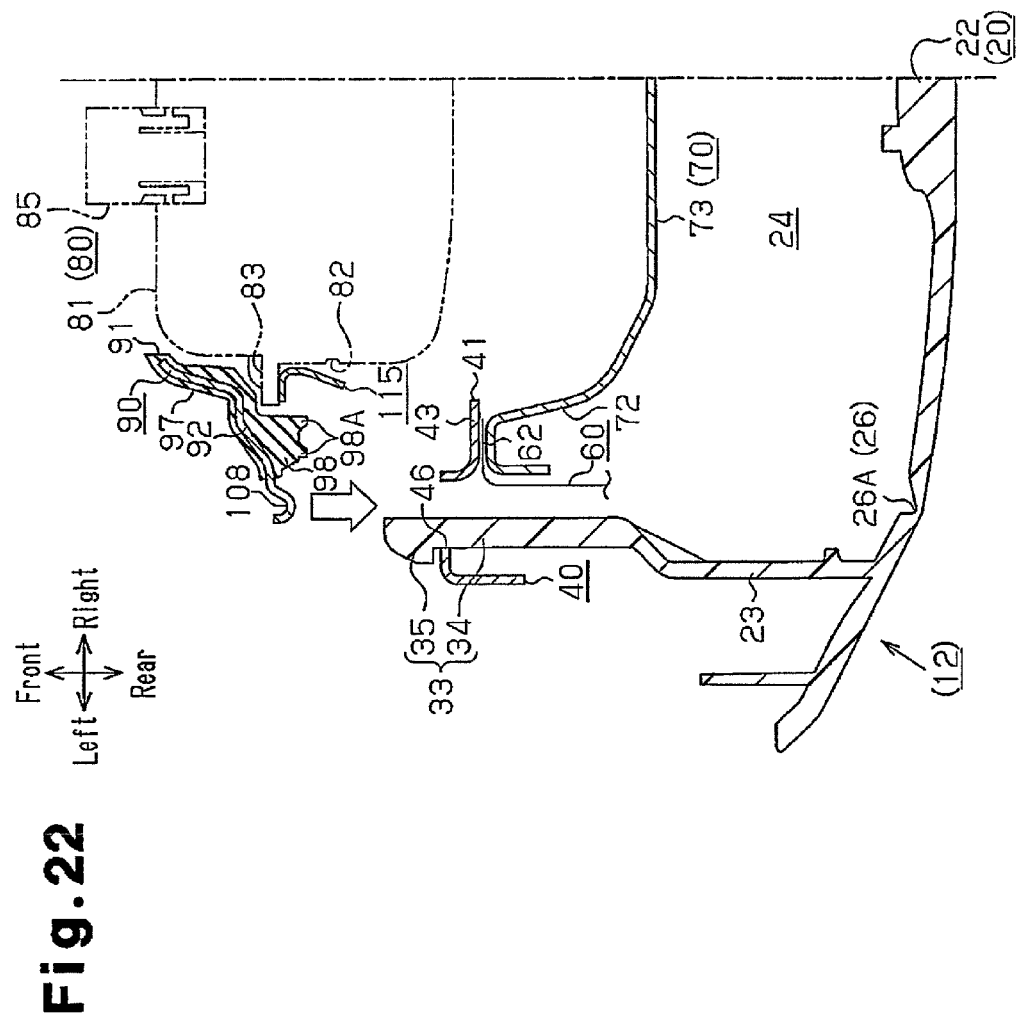

AIRBAG APPARATUS

BACKGROUND OF THE INVENTION

The present invention relates to an airbag apparatus incorporated in a steering wheel of a vehicle or the like. More particularly, the present invention pertains to an airbag apparatus that elastically support an inflator with an elastic support portion, thereby causing the inflator to function as a damper mass of a dynamic damper and causing the elastic support portion to function as a spring of the dynamic damper.

During high-speed running of a vehicle or idling of the vehicle engine, vibration transmitted to the steering wheel, which is rotated about the steering shaft, may impair driver comfort. In this regard, techniques for suppressing steering wheel vibrations have been conventionally developed and proposed. One of such techniques uses a dynamic damper that includes a weight and an elastic member, with which the weight is supported by, for example, the metal core of a steering wheel. According to the technique, when vibration the frequency of which is equal to or close to the resonance frequency of the dynamic damper is transmitted to the dynamic damper from the steering wheel, the dynamic damper resonates to absorb vibration energy of the steering wheel. This suppresses the vibration of the steering wheel.

A typical steering wheel is equipped with an incorporated airbag apparatus for protecting the driver at a collision of the vehicle. An airbag apparatus includes an airbag, a bag holder, an inflator, and a retainer, as disclosed, for example, in Japanese Laid-Open Patent Publication No. 2009-196466. The bag holder is supported by a steering wheel, and the airbag is located rearward of the bag holder. The inflator supplies gas to the airbag, thereby inflating the airbag. The retainer has an annular bag attachment portion. A peripheral portion of the opening of the airbag is held between the bag attachment portion and the bag holder. The airbag is attached to the bag holder by fastening the bag attachment portion to the bag holder. Further, the retainer includes arch portions extending rearward from multiple positions on the inner rim of the bag attachment portion. The arch portions surround the inflator from outside with respect to the radial direction of the steering shaft.

Since the airbag apparatus occupies a large part of the interior space of the steering wheel, it is difficult to incorporate the above described dynamic damper in recent steering wheels. In this regard, a structure has been proposed in which an inflator is elastically supported by a bag holder with elastic support portions, so that the inflator functions as a damper mass of a dynamic damper, and the elastic support portions function as springs of the dynamic damper. In this case, it is important that there be nothing that hinders vibrations of the inflator. In the above described airbag apparatus, the arch portions of the retainer surround the inflator while being spaced from the inflator, so that a space for vibration is ensured. This prevents the airbag from contacting the inflator.

However, since the arch portions of the retainer extend rearward from multiple positions on the inner rim of the bag attachment portion, the peripheral portion of the opening of the airbag is often exposed between the arch portions. Also, since the boundary between the inner rim of the bag attachment portion and each arch portion is often formed by bending to be curved, the peripheral portion of the airbag opening is likely to be exposed at these curved parts of the retainer. Such exposed parts of the airbag may contact high-temperature gas and may be affected by the gas heat.

SUMMARY OF THE INVENTION

Accordingly, it is an objective of the present invention to provide an airbag apparatus that is capable of preventing the peripheral portion of the opening of an airbag from being affected by the heat of gas ejected by an inflator.

To achieve the foregoing objective and in accordance with one aspect of the present invention, an airbag apparatus is provided, which is incorporated in a steering wheel that is rotated about a steering shaft having a longitudinal direction. The airbag apparatus includes a bag holder supported by the steering wheel, an airbag, an inflator, and a retainer. The airbag has an opening and a peripheral portion surrounding the opening, and is located rearward of the bag holder in the longitudinal direction. The inflator is elastically supported by the bag holder with an elastic support portion and is adapted for supplying gas into the airbag to inflate the airbag. The retainer includes an annular bag attachment portion having an inner rim. The retainer is fastened to the bag holder at the bag attachment portion such that the peripheral portion of the airbag is held between the bag attachment portion and the bag holder. The retainer further includes an arch portion and a bag encompassing portion. The arch portion extends rearward in the longitudinal direction from the inner rim of the bag attachment portion. The arch portion surrounds the inflator from outside in a radial direction of the steering shaft. The bag encompassing portion extends inward in the radial direction from the inner rim of the bag attachment portion. The bag encompassing portion encompasses the peripheral portion of the airbag.

Other aspects and advantages of the invention will become apparent from the following description, taken in conjunction with the accompanying drawings, illustrating by way of example the principles of the invention.

BRIEF DESCRIPTION OF THE DRAWINGS

FIG. 22 is a cross-sectional view that corresponds to FIG. 9, illustrating a state before the support plate is assembled to the bag holder.

DETAILED DESCRIPTION OF THE PREFERRED EMBODIMENTS

An airbag apparatus incorporated in a vehicle steering wheel according to one embodiment of the present invention will now be described with reference to FIGS. 1 to 22.

Figure 1:
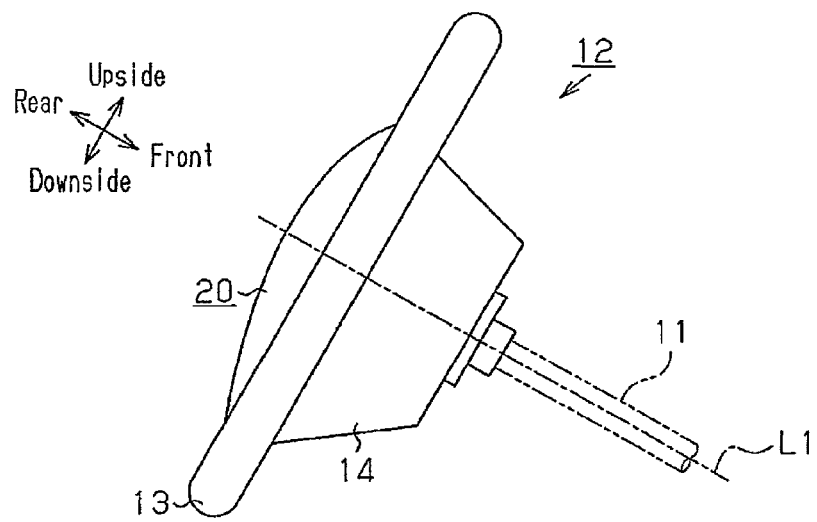
FIG. 1 is a diagrammatic side view illustrating a steering wheel in which an airbag apparatus according to one embodiment of the present invention is installed.

As shown in FIG. 1, a steering shaft 11, which is rotated about a rotation axis L1, is arranged in front of the driver's seat of a vehicle. The rotation axis L1 is inclined such that the height of the steering shaft 11 is raised toward the driver's seat (toward the rear end of the vehicle, or toward left side as viewed in FIG. 1). A steering wheel 12 is attached to the rear end of the steering shaft 11 to be rotated integrally with the steering shaft 11.

In the following description on elements of the steering wheel 12, the terms relating to front, rear, up, and down are all defined using the rotation axis L1 of the steering shaft 11 as a reference. That is, the front-rear direction of the steering wheel 12 does not match with the front-rear direction of the vehicle, which is a horizontal direction, but matches with a direction along the rotation axis L1 which is the longitudinal direction of the steering shaft 11. Also, the up-down direction of the steering wheel 12 does not match with the up-down direction of the vehicle, which is a vertical direction, but matches with a direction that is orthogonal to both of the rotation axis L1 and the widthwise direction of the vehicle. On the other hand, the left-right direction of the steering wheel 12 matches with the widthwise direction (or the left-right direction) of the vehicle. However, in the following description on elements of the steering wheel 12, the terms relating to up, down, left, and right are all defined using, as a reference, a state of the steering wheel 12 when the vehicle is traveling in a straight line, that is, the neutral position of the steering wheel 12.

The steering wheel 12 includes a rim portion (also referred to as a grip portion or a ring portion) 13, a pad cover 20, a lower cover 14, and spoke portions (hidden in FIG. 1). The pad cover 20 and the lower cover 14 form a pad portion.

The rim portion 13 substantially has an annular shape the center of which coincides with the steering shaft 11. The pad cover 20 is located in a central part of the rim 13. The lower cover 14 is located in front of the pad cover 20 at the central part. The spoke portions are formed between the rim portion 13 and the pad cover 20.

Figure 12:
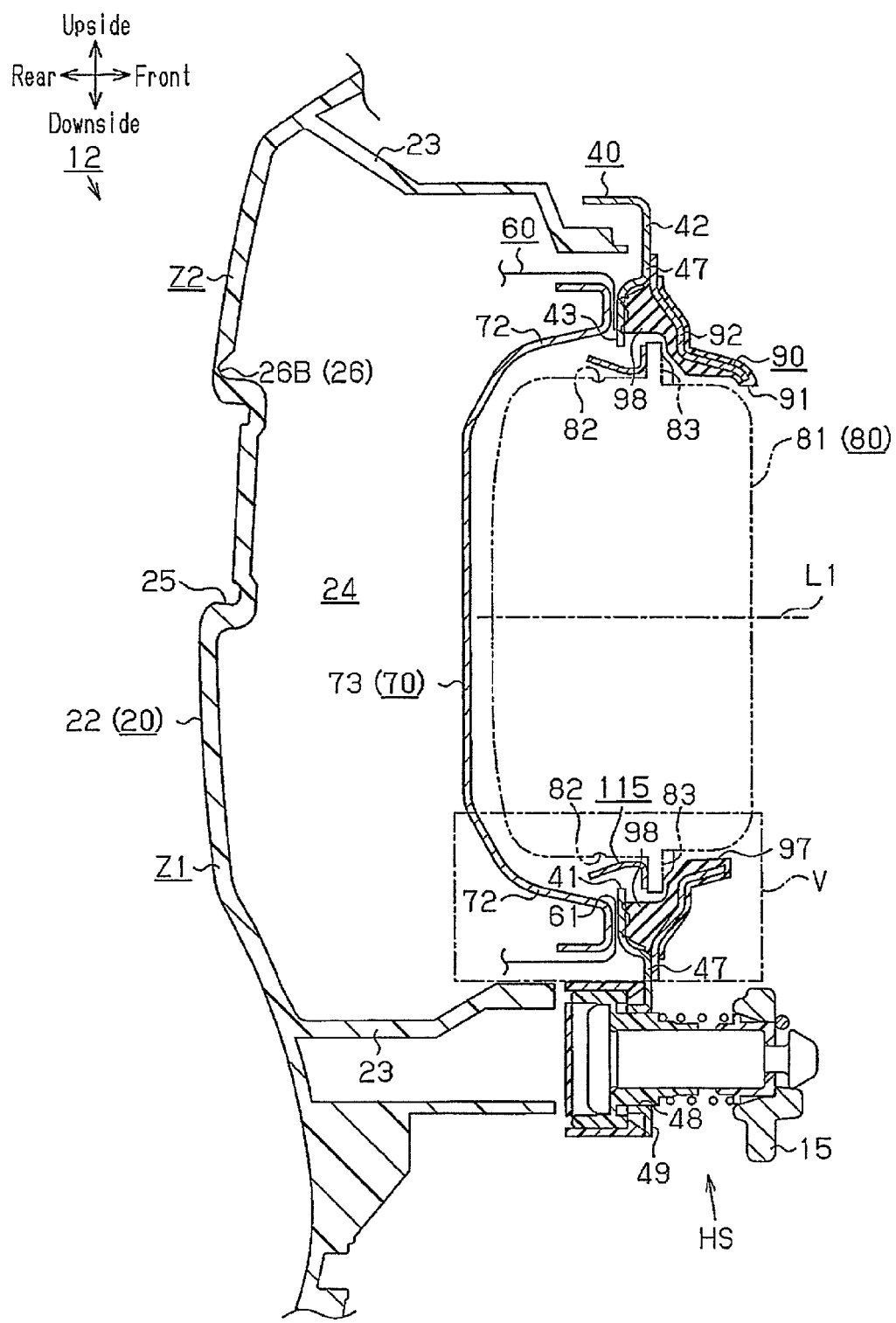
FIG. 12 is a cross-sectional view taken along line 12-12 of FIG. 11, illustrating the airbag apparatus.

A metal core 15, which is made of metal such as iron, aluminum, magnesium, or an alloy thereof, is arranged inside the rim portion 13 and the spoke portions of the steering wheel 12 and in the space surrounded by the pad cover 20 and the lower cover 14 (see FIG. 12). The core 15 forms a framework of the steering wheel 12.

In addition to the core 15, the airbag apparatus is located in the space surrounded by the pad cover 20 and the lower cover 14. When an impact is applied to the vehicle from front due to, for example, a frontal collision, the airbag apparatus shown in FIGS. 3 and 4 causes an inflator 80, which is a gas generator, to supply gas G to an airbag 60 to inflate the airbag 60 forward to absorb the impact applied to the driver. The airbag apparatus includes a vibration suppression structure for suppressing vibration of the steering wheel 12.

In addition to the above described pad cover 20, inflator 80, and airbag 60, the airbag apparatus includes a bag holder 40, a cup retainer 70, a support plate 90, and a gas plate 115. Among these, the bag holder 40 forms a framework of the airbag apparatus, and the other components are attached to the bag holder 40. The pad cover 20, which is one of the components of the pad portion of the steering wheel 12, also functions as a component of the airbag apparatus. These components of the airbag apparatus will now be described.

<Bag Holder 40>

Figure 13:
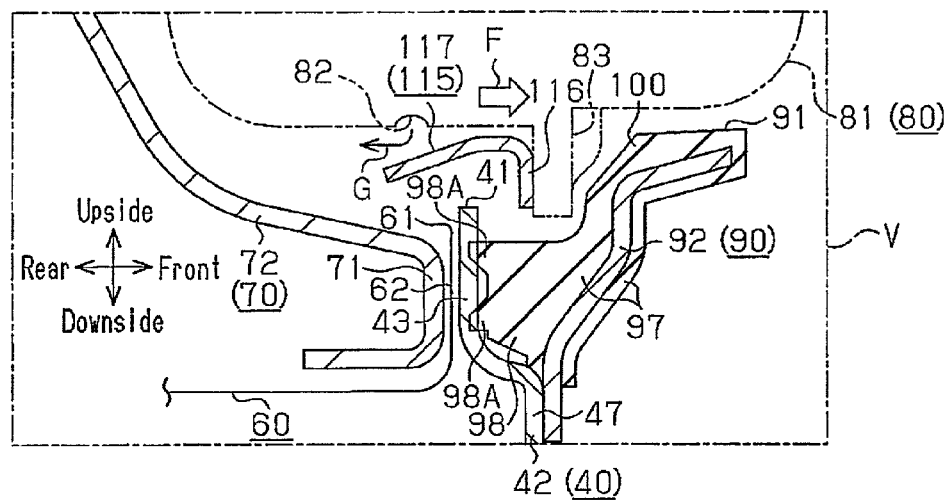
FIG. 13 is an enlarged cross-sectional view illustrating region V of FIG. 12.
Figure 19:
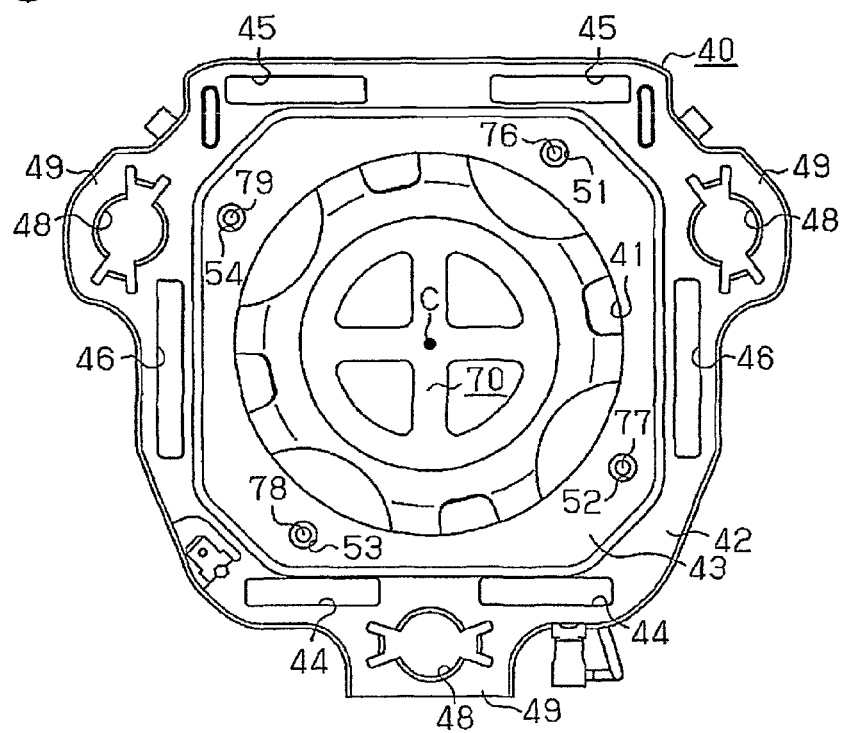
FIG. 19 is a rear view illustrating a state in which the bolt of the cup retainer is inserted into the bolt hole of the bag holder.

As shown in FIGS. 12 and 13, the bag holder 40 is formed by pressing a metal plate, which is a hard material to have a circular insertion hole 41 at the center (refer to FIG. 19). The bag holder 40 has a rectangular shape as viewed from front. The illustration of the airbag 60 is omitted from FIG. 11. The bag holder 40 is roughly formed by a base portion 42, which is forms a radially outer portion with respect to the radial direction of the steering shaft 11, and a step portion 43, which forms a radially inner portion. The step portion 43 is located rearward of the base portion 42.

Figure 11:
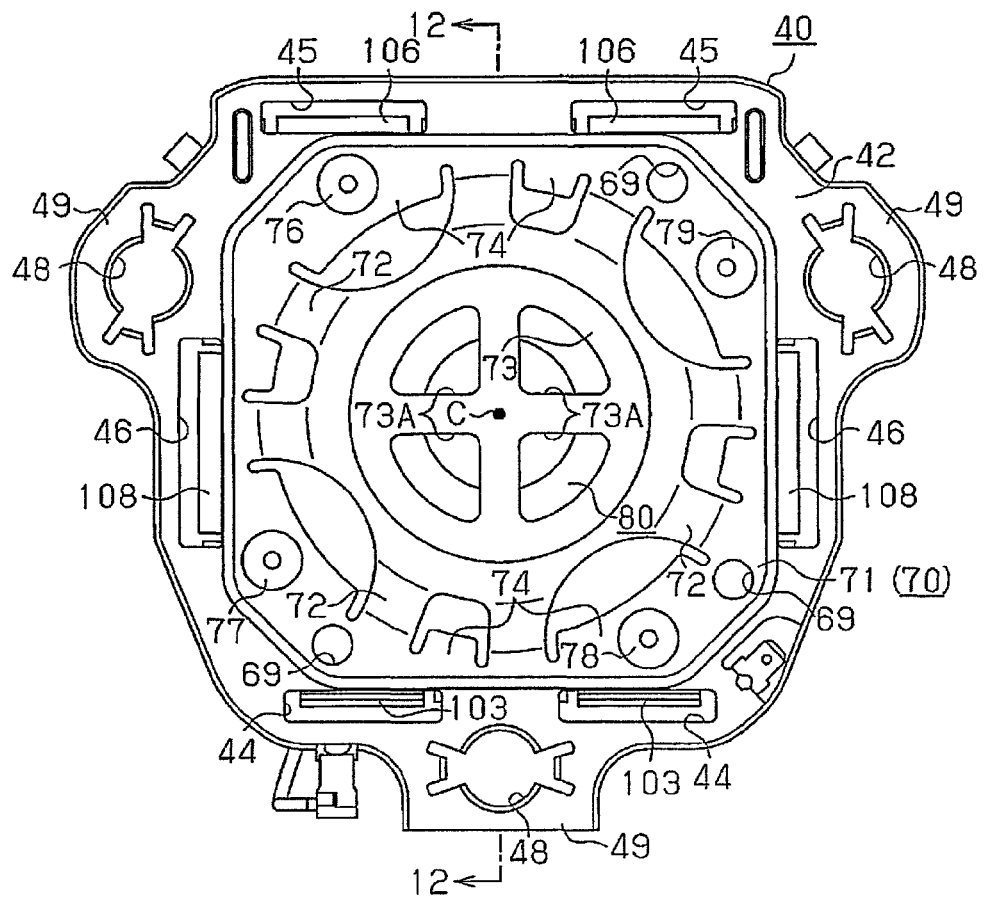
FIG. 11 is a front view illustrating some airbag apparatus components including a bag holder, a cup retainer, and an inflator in the embodiment.
Figure 20A:
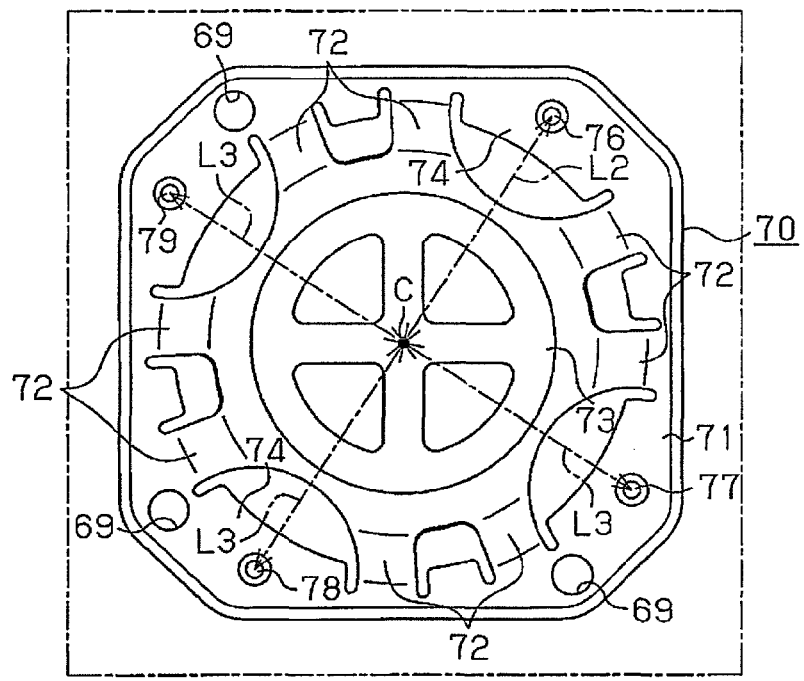
FIG. 20A is a rear view illustrating the cup retainer before the bolt of the cup retainer is inserted into the bolt hole of the bag holder.
Figure 20B:
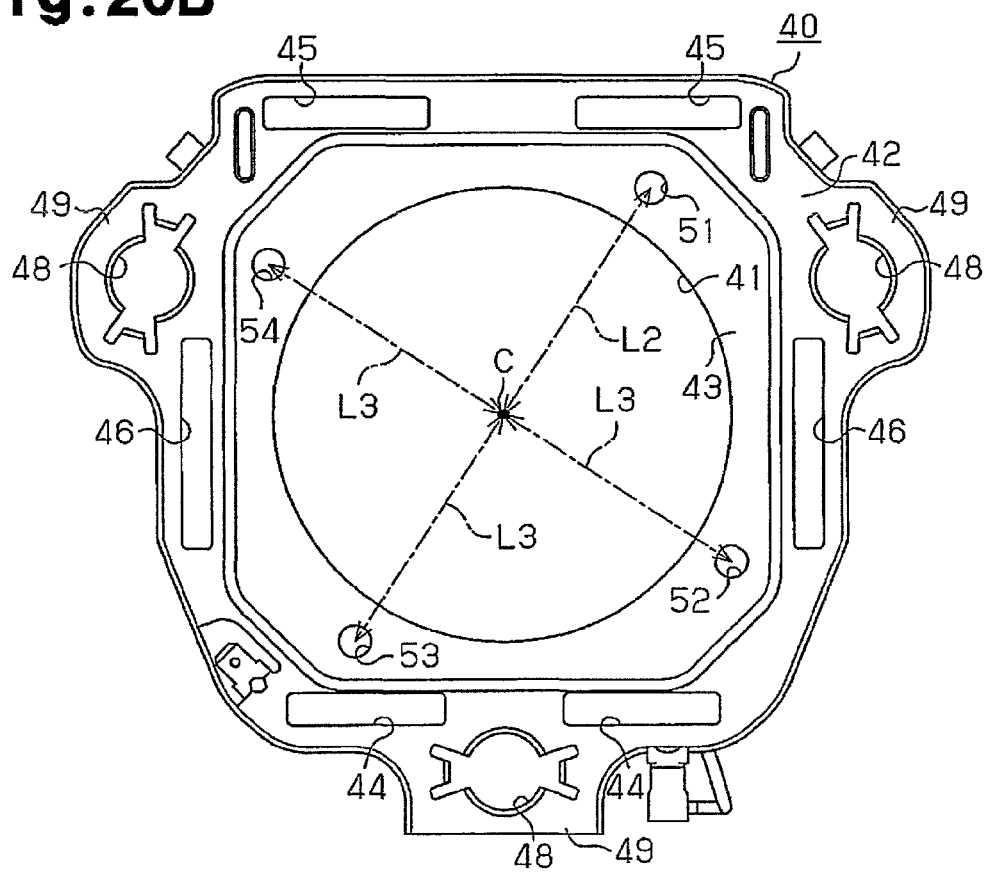
FIG. 20B is a rear view illustrating the bag holder before the bolt of the cup retainer is inserted into the bolt hole of the bag holder.

As shown in FIGS. 11 and 20B, the base portion 42 has six securing holes about the insertion hole 41. The securing holes include a pair of primary securing holes 44, which are located below the insertion hole 41, a pair of secondary securing holes 45, which are located above the insertion hole 41, and a pair of tertiary securing holes 46 located on the left and right sides of the insertion hole 41. The primary securing holes 44 are elongated holes with a clearance in between and extend in the left-right direction. The secondary securing holes 45 are elongated holes with a clearance in between and extend in the left-right direction. The tertiary securing holes 46 are elongated holes extending in the up-down direction. The primary securing holes 44 and the secondary securing holes 45 face each other in the up-down direction with the insertion hole 41 located in between. The tertiary securing holes 46 face each other in the left-right direction with the insertion hole 41 located in between.

The base portion 42 has a contact portion 47, which is located at a position different from the securing holes 44 to 46. The contact portion 47 is formed as a flat plate and is orthogonal to the rotation axis L1 (see FIGS. 12 and 13).

The base portion 42 has three attachment portions 49 about the insertion hole 41. Each attachment portion 49 has an attachment hole 48 and extends outward with respect to the radial direction of the steering shaft 11. A horn switch mechanism HS (see FIG. 12) for activating a horn device (not shown) mounted on the vehicle is attached to the attachment hole 48 of each attachment portion 49. Each horn switch mechanism HS is supported by the core 15 of the steering wheel 12. Accordingly, the airbag apparatus is in a floating state with respect to the core 15 and can be moved (displaced) in the front-rear direction in accordance with deformation of the horn switch mechanisms HS.

Four bolt holes 51 to 54 are formed about the insertion hole 41 in the step 43. The bolt holes 51 to 54 are separated at equal angular intervals (90 degrees).

<Pad Cover 20>

Figure 4:
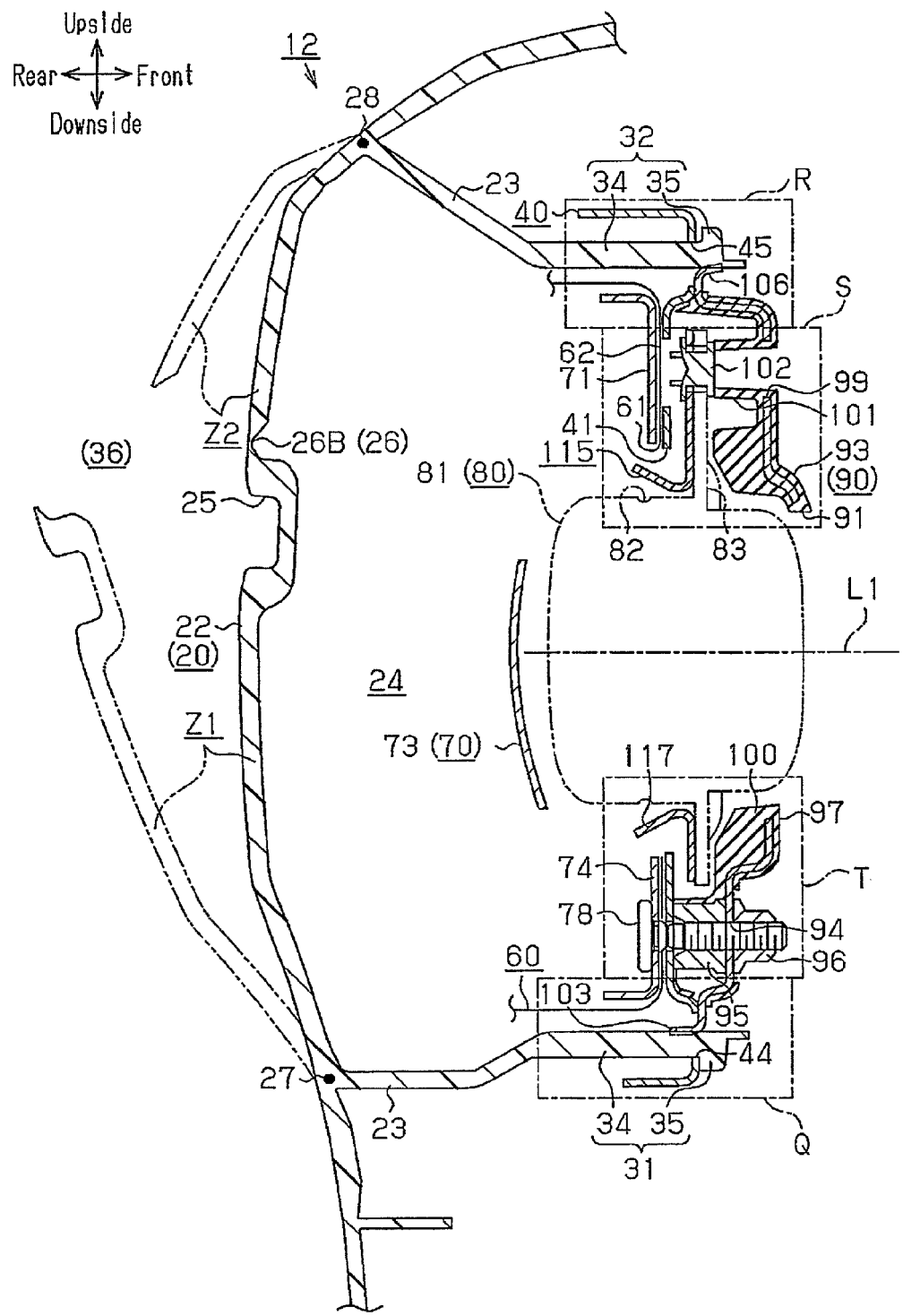
FIG. 4 is a cross-sectional view taken along line 4-4 of FIG. 3, illustrating the airbag apparatus.
Figure 9:
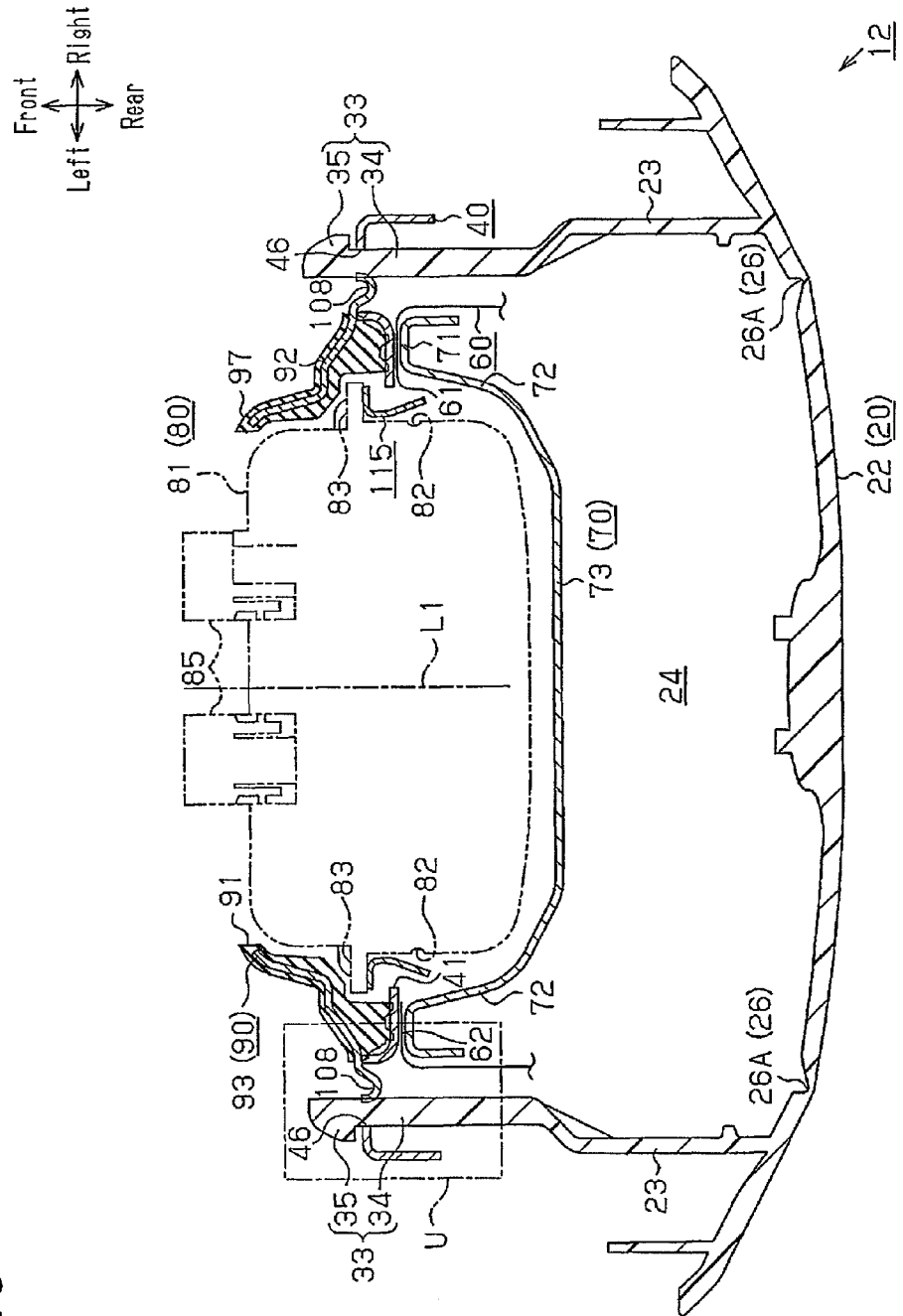
FIG. 9 is a cross-sectional view taken along line 9-9 of FIG. 3, illustrating the airbag apparatus.

As shown in FIGS. 4 and 9, the pad cover 20 includes a lid 22 and an annular accommodating wall 23, which extends forward from the lid 22. The pad cover 20 is made of synthetic plastic and is arranged behind the bag holder 40. An accommodating space 24 is formed between the pad cover 20 and the hag holder 40.

A laterally elongated elliptic recess 25, which opens in the rear surface (outer surface) of the lid 22, is formed substantially at the center of the lid 22. An ornamental member (not shown) made of a hard material is attached to the recess 25 to improves the appearance (design) of the pad cover 20.

Figure 2:
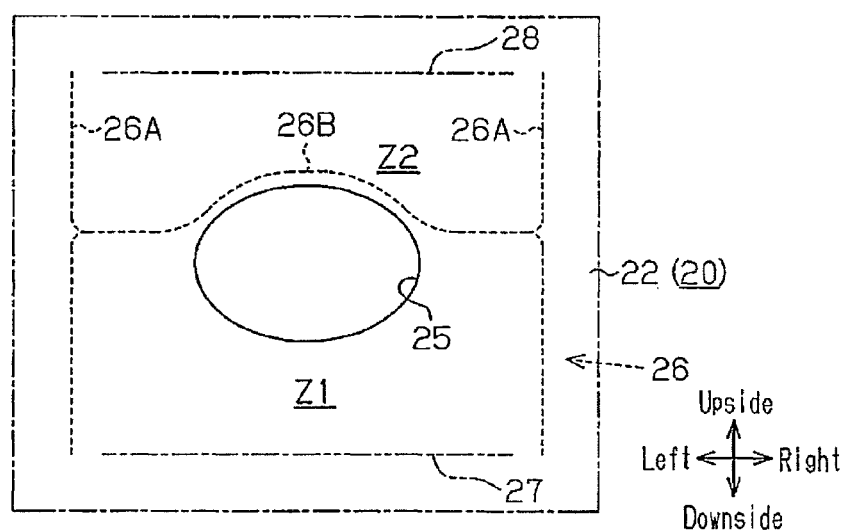
FIG. 2 is a front view illustrating a part of a pad cover in the embodiment.

As indicated by broken lines in FIG. 2, the lid 22 has linear breakable portion 26 (hereinafter, referred to as tear line) on the front surface (inner surface). A part of the lid 22 at which the tear line 26 is formed has less thickness than the remaining parts of the lid 22. The tear line 26 includes two vertical sections 26A, which are separated from each other in the left-right direction and extend in the up-down direction, and a lateral section 26B, which extends substantially in the left-right direction substantially at a middle position in the up-down direction of the lid 22 to connect the vertical sections 26A to each other.

A middle part of the lateral section 26B is separated upward from the ornamental portion (the recess 25). The design is adopted to allow the lid 22 to break only at the tear line 26 without chipping or breaking the hard plastic ornamental portion when high pressing force is applied to the lid 22 by the airbag 60.

The lid 22 is divided into two zones by the tear line 26. The two zones are a first zone Z1, which is substantially the lower half of the lid 22, and a second zone Z2, which is substantially the upper half of the lid 22. The first zone Z1 includes the recess 25, while the second zone Z2 does not include the recess 25. The first zone 21 is thus larger than the second zone 22.

The part of the lid 22 where the tear line 26 is formed is thinner than the remainder of the lid 22 and therefore has lower strength. Thus, when the airbag 60 is deployed and inflated, the lid 22 is broken at the tear line 26. At this time, the lowermost part of the first zone Z1 in the lid 22 serves a hinge portion 27, which extends in the left-right direction, and the uppermost part of the second zone Z2 serves as a hinge portion 28, which extends in the left-right direction. In FIG. 4, the hinge portions 27, 28 are indicated by dots (Ω).

Figure 3:
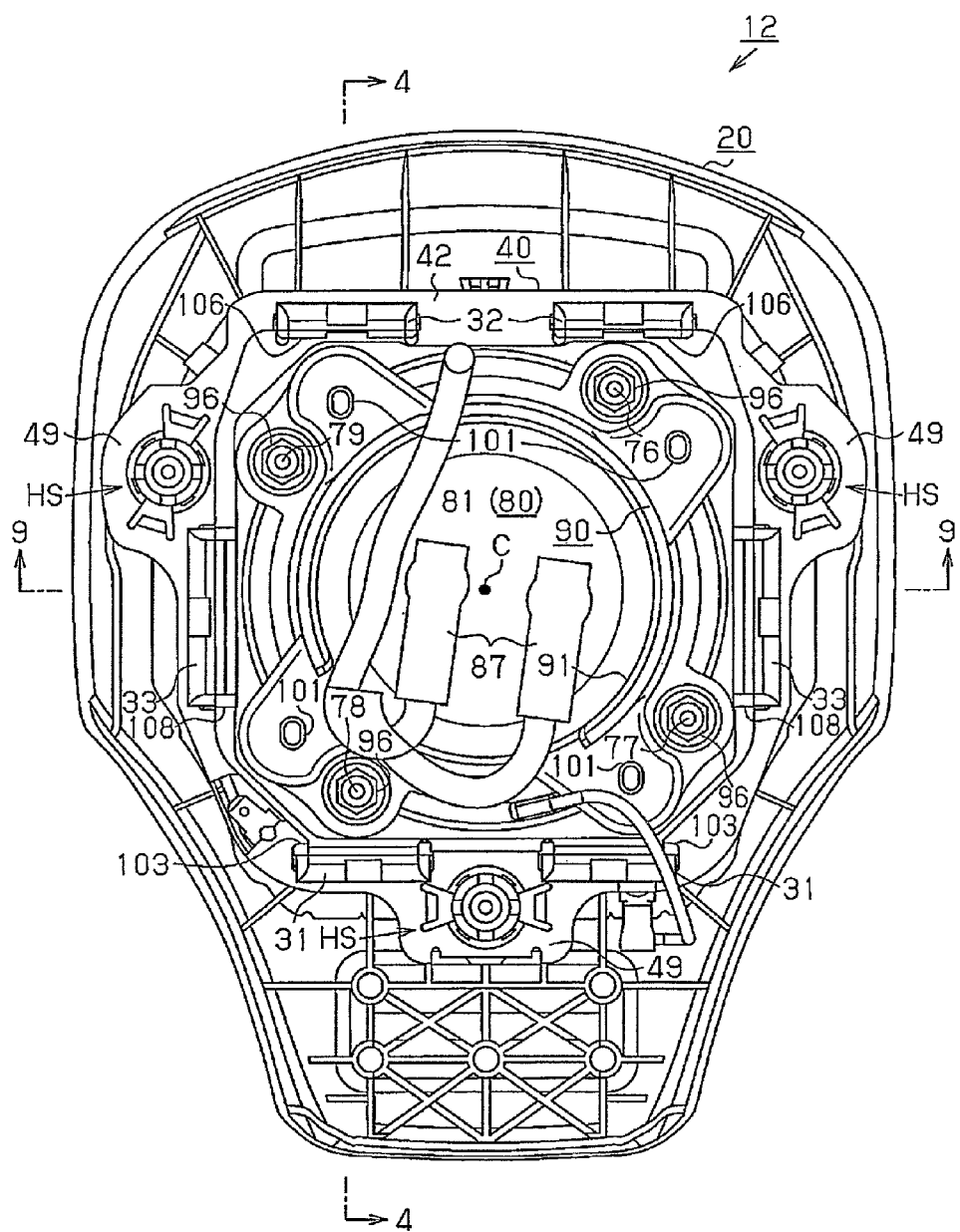
FIG. 3 is a rear view illustrating the airbag apparatus in the embodiment.

As shown in FIGS. 3 and 4, the accommodating wall 23 has six securing portions. The securing portions include a pair of primary securing portions 31, which are located in a lower portion of the accommodating wall 23, a pair of secondary securing portions 32, which are located in an upper portion of the accommodating walls 23, and a pair of tertiary securing portions 33 located on the left and right sides of the accommodating wall 23. The primary securing portions 31 are, together with the primary securing holes 44, located in front of the first zone Z1. The secondary securing portions 32 are, together with the secondary securing holes 45, located in front of the second zone Z2.

The primary securing portions 31 extend forward and are spaced from each other in the left-right direction. The secondary securing portions 32 extend forward and are spaced from each other in the left-right direction. The tertiary securing portions 33 extend forward substantially from a middle part of the accommodating wall 23 in the up-down direction. The primary securing portions 31 and the secondary securing portions 32 face each other in the up-down direction, and the tertiary securing portions 33 face each other in the left-right direction.

Figure 5:
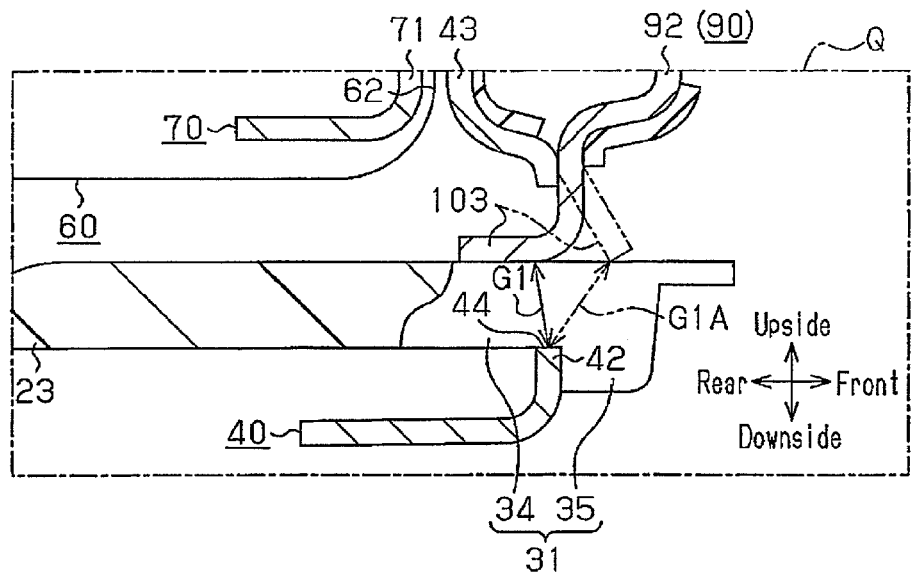
FIG. 5 is an enlarged cross-sectional view illustrating region Q of FIG. 4.
Figure 6:
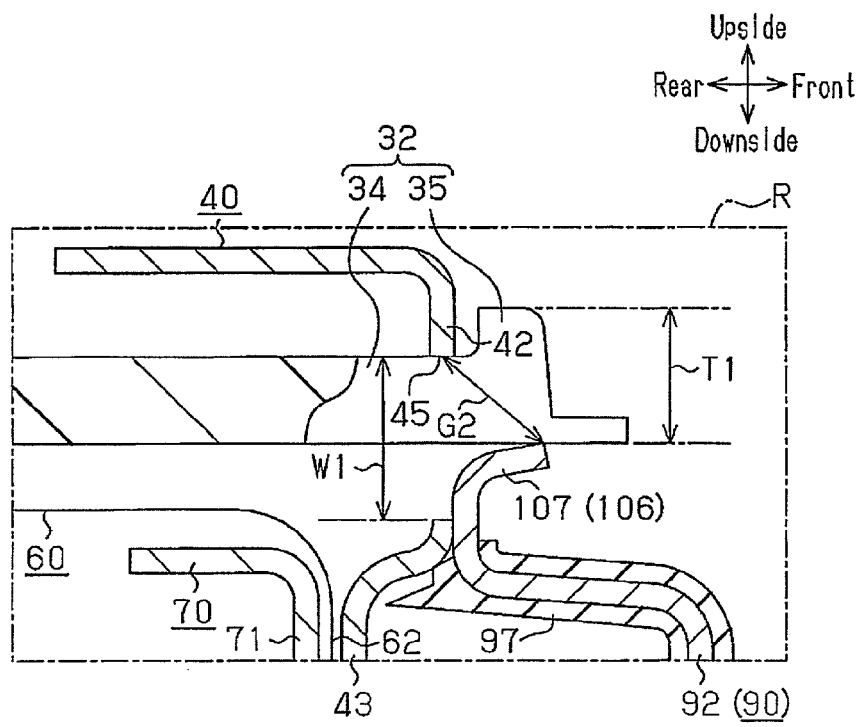
FIG. 6 is an enlarged cross-sectional view illustrating region R of FIG. 4.

As shown in FIGS. 5 and 6, each of the securing portions 31 to 33 includes a rectangular-plate like main body 34 and a claw portion 35, which is located in front of the main body 34 and protrudes outward in the radial direction of the steering shaft 11.

In the securing portions 31 to 33, the claw portions 35 are located forward of the base portion 42 and outward of the securing holes 44 to 46 in the radial direction of the steering shaft 11. The positional relationship between the claw portions 35 and the securing holes 44 to 46 causes the pad cover 20 to be secured to the bag holder 40, so that rearward movement of the pad cover 20 is restricted.

The maximum thickness Ti of the securing portions 31 to (the thickness of the claw portions 35) is slightly smaller than the width W1 of the securing holes 44 to 46. This structure is required for allowing the securing portions 31 to 33 to be inserted into the securing holes 44 to 46.

<Airbag 60>

As shown in FIGS. 4 and 9, the airbag 60 is a bag that is inflated by gas and made of fabric having high strength and flexibility such as woven cloth. The airbag 60 has such a size that it occupies a large space between the steering wheel 12 and the driver when inflated.

A gas vent hole (not shown) is formed in a part of the airbag 60 that is located in the front and upper portion when the airbag 60 is inflated. The objective of the vent hole is to discharge excessive gas to the outside of the airbag 60 so that the internal pressure of the airbag 60 is adjusted to a value appropriate for protecting an occupant (pressure adjustment).

Figure 15:
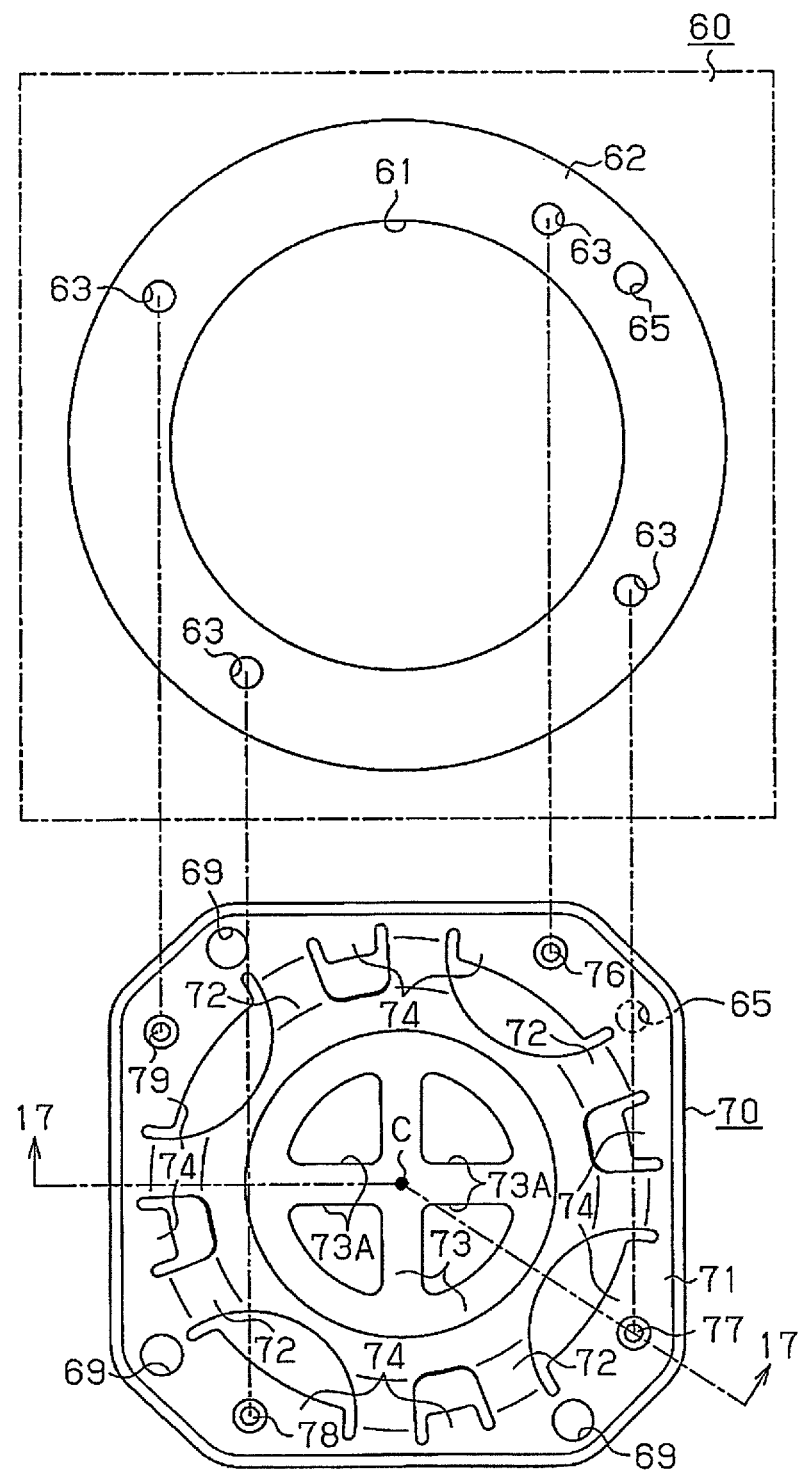
FIG. 15 is a rear view of the peripheral portion of the opening of an airbag to be secured to the cup retainer.

The airbag 60 has at its front end an opening 61 (see FIG. 15). A part of the airbag 60 that annularly surrounds the opening 61 (hereinafter, a peripheral portion 62) is formed to have a higher strength than the other parts of the airbag 60. The peripheral portion 62 has four bolt holes 63 about the opening 61. The bolt holes 63 are separated at equal angular intervals (90 degrees). The peripheral portion 62 is located behind the step 43 of the bag holder 40.

Although not illustrated, a large part of the airbag 60 except for the peripheral portion 62 is folded into a compact form and arranged in the accommodating space 24.

<Cup Retainer 70>

Figure 16:
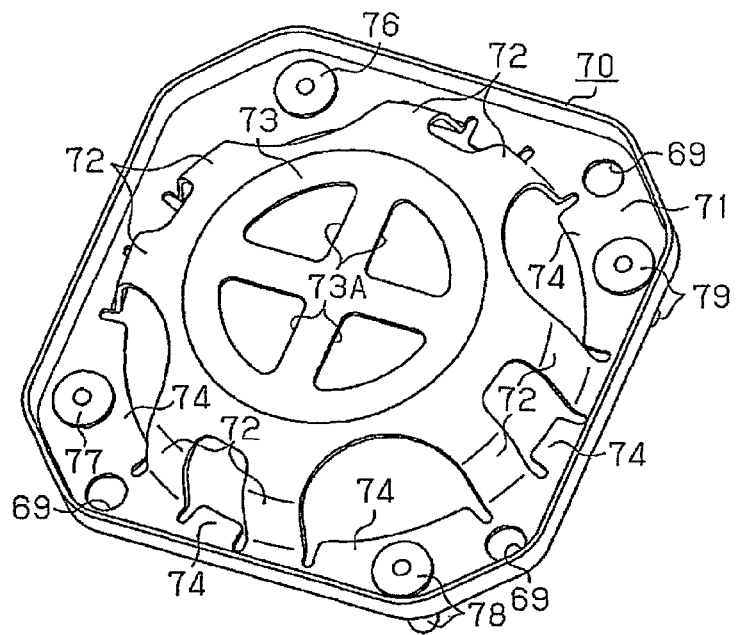
FIG. 16 is a perspective view illustrating the cup retainer, as viewed from diagonally behind.

The cup retainer 70, which is illustrated in FIG. 16, is formed by pressing a metal plate having conductivity. The cup retainer 70 includes a bag attachment portion 71, a plurality of arch portions 72, a cover portion 73, and a plurality of bag encompassing portions 74. The cup retainer 70 is inserted into the airbag 60 via the opening 61.

The bag attachment portion 71 is a main part of the cup retainer 70 and has a rectangular loop-like outer shape as viewed from front. Most of the bag attachment portion 71 is formed like a flat plate and is located behind the peripheral portion B2 of the airbag 60.

Four bolts 76 to 79, which are separated at equal angular intervals (90 degrees), are inserted and fixed to the bag attachment portion 71. The bolts 76 to 79 have the same diameter.

Figure 8:
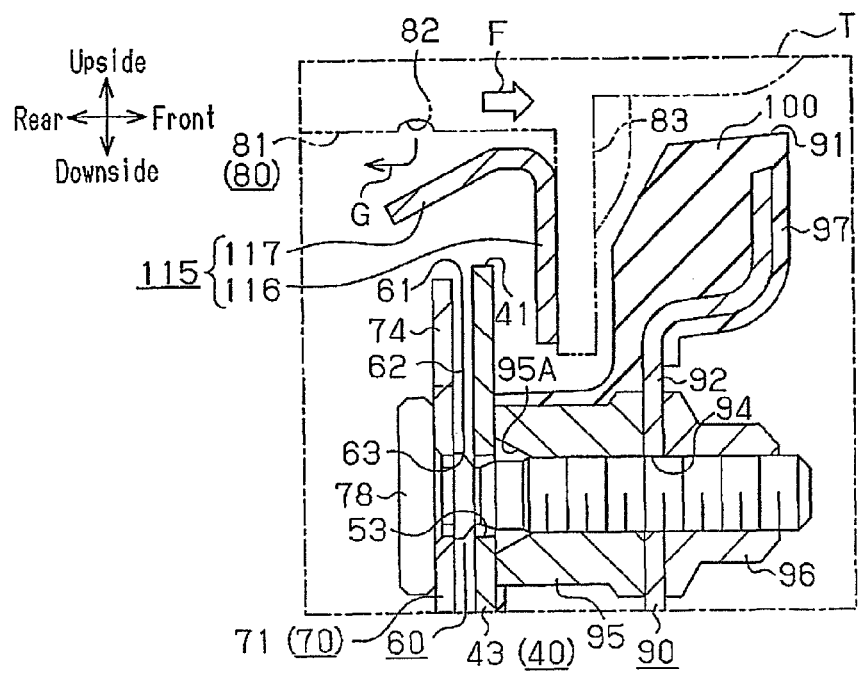
FIG. 8 is an enlarged cross-sectional view illustrating region T of FIG. 4.

As shown in FIGS. 4 and 8, the bolts 76 to 79 extend forward from the bag attachment portion 71 to be inserted into the bolt holes 63 of the airbag 60 and the bolt holes 51 to 54 of the bag holder 40. By inserting the bolts 76 to 79 to the bolt holes 63 of the airbag 60, the airbag 60 is secured to the cup retainer 70 via the bolts 76 to 79. By inserting the bolts 76 to 79 to the bolt holes 51 to 54 of the bag holder 40, the cup retainer 70 is secured to the bag holder 40.

As shown in FIG. 16, the arch portions 72 extend rearward from the inner rim of the bag attachment portion 71. The arch portions 72 are arranged circumferentially while being separated apart from one another. Parts of the inner rim of the bag attachment portion 71 at which the arch portions 72 are formed are separated circumferentially from the bolts 76 to 79. In other words, the circumferential position of each arch portion 72 is between an adjacent pair of the bolts 76 to 79.

The cover portion 73 is located behind and separated apart from the bag attachment portion 71. The rear ends of the arch portions 72 are connected to the cover portion 73. The cover portion 73 has a plurality of gas ports 73A.

The bag encompassing portions 74 are designed for covering the peripheral portion 52 of the airbag 60 and extend inward in the radial direction of the steering shaft 11 from the inner rim of the bag attachment portion 71. The bag encompassing portions 74 are arranged substantially in all the areas of the inner rim of the bag attachment portion 71 that are each located between an adjacent pair of the arch portions 72. Therefore, the bag encompassing portions 74 are arranged on the inner rim of the bag attachment portion 71 at positions that correspond to parts where the bag attachment portion 71 is fastened to the bag holder 40 by means of the bolts 76 to 79. That is, the bag encompassing portions 74 are located inward of the fastening portion with respect the radial direction of the steering shaft 11.

<Inflator 80>

As shown in FIGS. 4 and 9, the main portion of the inflator 80 is formed by a columnar main body 81 the center of which coincides with the rotation axis L1 of the steering shaft 11. The main body 81 has an outer diameter that is smaller than any of the diameter of the insertion hole 41 of the bag holder 40, the diameter of the space surrounded by the bag encompassing portions 74 of the cup retainer 70, and the diameter of the opening 61 of the airbag 60. A rear portion of the main body 81 is inserted into the insertion hole 41 and the opening 61.

The main body 81 accommodates a gas generating agent (not shown), which generates gas G for inflating the airbag 60. A plurality of gas ejection holes 82 are formed on the outer circumferential surface of the main body 81 at equal angular intervals, so that the gas G is ejected outward through the gas ejection holes in the radial direction of the steering shaft 11.

A flange 83 is formed on the entire outer circumferential surface of the main body 81, at a position forward of the gas ejection holes 82 and forward of the insertion hole 41 of the bag holder 40. The flange 83 has four attachment pieces 83A located about the main body 81. The attachment pieces 83A protrude further radially outward than the other parts of the flange 83. A fastener hole (rivet hole) 84 is formed in each attachment piece 83A (see FIG. 7).

A connector 85 is assembled to the front portion of the inflator 80, and a harness 87, through which an activation signal is input to the inflator 80, is connected to the connector 85 (see FIG. 3).

In place of the type using the gas generating agent as shown above, it is possible to use, as the inflator 80, a type of inflator that breaks a partition wall of a high-pressure gas cylinder filled with a high-pressure gas by a low explosive so as to jet out the gas.

<Support Plate 90>

Figure 14:
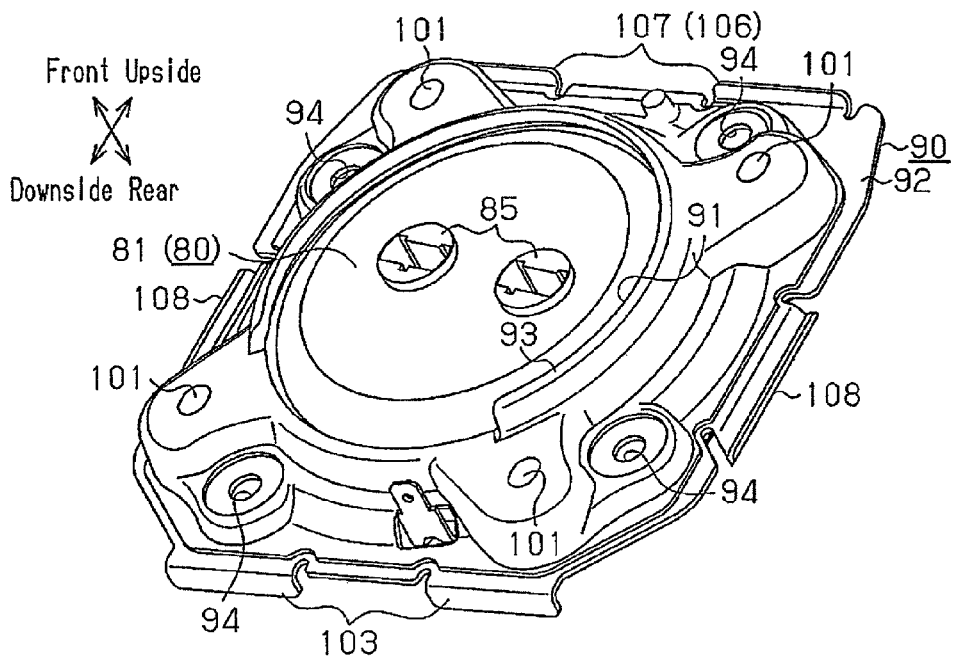
FIG. 14 is a perspective view illustrating some airbag apparatus components including a support plate and the inflator in the embodiment, as viewed from diagonally front.

As shown in FIG. 14, the support plate 90 is formed by pressing a hard metal plate to have an annular shape with a through hole 91 in the center. The support plate 90 includes an annular support base 92 and an arcuate cover portion 93. The support base 92 forms most part of the support plate 90 that includes an outer portion in the radial direction of the steering shaft 11, and the cover portion 93 forms an inner portion. Most part of the support base 92 is located in front of the base portion 42 of the bag holder 40. The support base 92 has a rectangular outer shape as viewed from front.

As shown in FIGS. 4 and 8, the support base 92 has four bolt holes 94 located about the through hole 91. The bolt holes 94 are separated at equal angular intervals (90 degrees, see FIG. 14). Collar (a cylindrical spacer) 95 are arranged on the back side of the support base 92. Each collar 95 is located on the same axis as one of the bolt holes 94. The collars 95 form a part of the support plate 90 and are coated, together with the support base 92, with an elastic portion 97, to be integrated with the support base 92. A rear portion of the inner circumferential surface of each collar 95 is formed as a tapered surface 95A so that the inner diameter of the collar 95 increases toward the rear end.

The bolts 76 to 79, which extend from the cup retainer 70 and through the bolt holes 63 of the airbag 60 and the bolt holes 51 to 54 of the bag holder 40, are inserted into the collars 95 and the bolt holes 94 of the support base 92. Nuts 96 are fastened to parts of the bolts 76 to 79 that protrude forward from the support base 92. Accordingly, the cup retainer 70 and the support plate 90 are fastened to the bag holder 40. In the fastened state, the arch portions 72 of the cup retainer 70 are each circumferentially separated apart from parts of the bag attachment portion 71 that are fastened to the bag holder 40 by means of the bolts 76 to 79. In other words, the arch portions 72 are each located between an adjacent pair of the bolts 76 to 79 (see FIG. 16). Also, the peripheral portion 62 of the opening 61 of the airbag 60 is sandwiched from front and behind by the cup retainer 70 and the bag holder 40. A part of the elastic portion 97 functions as an elastic protrusion 100, which protrudes rearward from an inner portion of the support base 92 with respect to the radial direction of the steering shaft 11. The elastic protrusion 100 surrounds and is separated from the main body 81 of the inflator 80. The elastic protrusion 100 is separated forward from the flange 83 of the inflator 80.

As shown in FIGS. 12 and 13, in the support base 92, a part of the step 43 of the bag holder 40 that is in front of the contact portion 47 is formed as a fiat plate that is substantially orthogonal to the rotation axis L1 of the steering shaft 11. When assembled to the bag holder 40, the support plate 90 directly contacts, at the flat-plate part, the contact portion 47 of the bag holder 40 without the elastic portion 97. That is, a metal-to-metal contact in a relatively wide area is established.

The cover portion 93 covers the front peripheral portion of the inflator 80 without contacting. The space surrounded by the cover portion 93 is an area where the harness 87 of the inflator 80 is routed when being drawing forward.

Most part of the support plate 90 is coated with the elastic portion 97, which is formed by elastic materials such as synthetic rubber and elastomer. The support plate 90 has a sealing portion 98, which is a part of the elastic portion 97 and protrudes rearward from the support base 92. The rear end of the sealing portion 98 has sealing protrusions 98A, which are provided at a plurality of (two, in the present embodiment) positions in the radial direction of the steering shaft 11. The sealing protrusions 98A contact the step 43 of the bag holder 40 while being elastically deformed. The sealing portion 98 thus seals between the bag holder 40 and the support plate 90. In FIG. 13, a part of each sealing protrusion 98A that overlaps with the step 43 indicates the state before the sealing protrusion 98A is elastically deformed.

Figure 7:
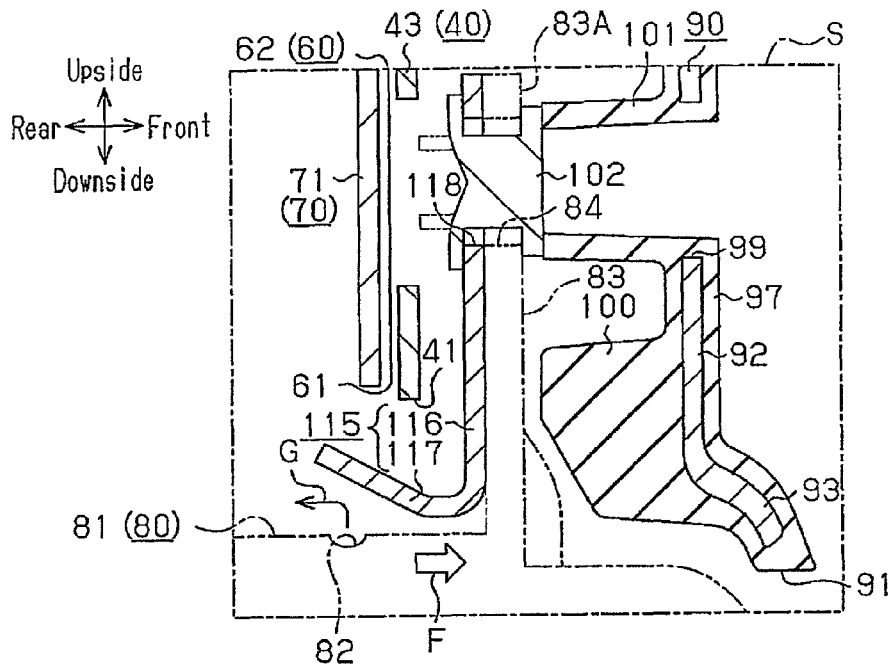
FIG. 7 is an enlarged cross-sectional view illustrating region S of FIG. 4.

As shown in FIGS. 4 and 7, the support plate 90 has a structure for elastically supporting the inflator 80. Specifically, the support base 92 has four holes 99 about the through hole 91. The holes 99 are separated at equal angular intervals (90 degrees). The support base 92 has cylindrical elastic support portions 101, each of which extends rearward from the inner wall of a hole 99. The front end of each elastic support portion 101 is connected to the elastic portion 97.

The elastic support portions 101, together with the inflator 80, form a dynamic damper. In the present embodiment, the elastic support portions 101 function as springs of the dynamic damper, and the inflator 80 functions as a damper mass.

The elastic support portions 101 may be formed separately from the elastic portion 97. In this case, the elastic support portions 101 are fixed to the support base 92, for example, by vulcanized adhesion. Also, a smaller diameter portion may be formed in the outer circumference of the front end of each elastic support portion 101, and the smaller diameter portions may be inserted into the holes 99 of the support base 92 so that the elastic support portions 101 are secured to the support base 92. In this case, the holes 99 restrict displacement of the elastic support portions 101 relative to the support base 92.

The size, the radial thickness, the length in the front-rear direction of the elastic support portions 101 are adjusted such that the resonance frequencies of the dynamic damper in the up-down direction and the left-right direction match with target frequencies (frequencies desired to be suppressed) for suppressing vibrations of the steering wheel 12 in the up-down direction and the left-right direction.

A metal rivet 102 is fixed to the rear end face of each elastic support portion 101, for example, by vulcanized adhesion. The rear portion of the rivet 102 is cylindrical with an open rear end, and is inserted into the fastener hole (the rivet hole) 84 formed in each of the attachment pieces 83A of the flange 83. The inserted rivets 102 secure the flange 83 with the elastic support portions 101.

The support plate 90 has a structure for pressing the securing portions 31 to 33 of the pad cover 20, which are inserted into the securing holes 44 to 46 of the bag holder 40, against the inner walls of the securing holes 44 to 46. The structure will now be described. As shown in FIGS. 5 and 14, primary pressing pieces 103 are formed by bending at two positions of the lower end of the support base 92 to extend rearward. The primary pressing pieces 103 are, together with the primary securing portions 31 and the primary securing holes 44, located in front of the first zone Z1 (see FIG. 4). Bending of the primary pressing pieces 103 is performed with the support plate 90 assembled to the bag holder 40, such that the primary pressing pieces 103 contact the primary securing portions 31 in the primary securing holes 44 or in the vicinity thereof.

As shown in FIGS. 6 and 14, secondary pressing pieces 106 are formed by bending at two positions of the upper end of the support base 92 to extend rearward. More specifically, each secondary pressing piece 106 has a secondary inclined portion 107, which is inclined such that the secondary pressing piece 106 is inclined outward of the support plate 90 in the radial direction of the steering shaft 11 toward the front end. In other words, the secondary inclined portion 107 is inclined to approach the secondary securing portion 32 toward the front end. The secondary pressing pieces 106 are, together with the secondary securing portions 32 and the secondary securing holes 45, located in front of the second zone Z2 (see FIG. 4). Bending of the secondary pressing pieces 106 is performed with the support plate 90 assembled to the bag holder 40, such that the distal ends (corners) contact the secondary securing portions 32 at positions separated forward from the secondary securing holes 45.

Figure 10:
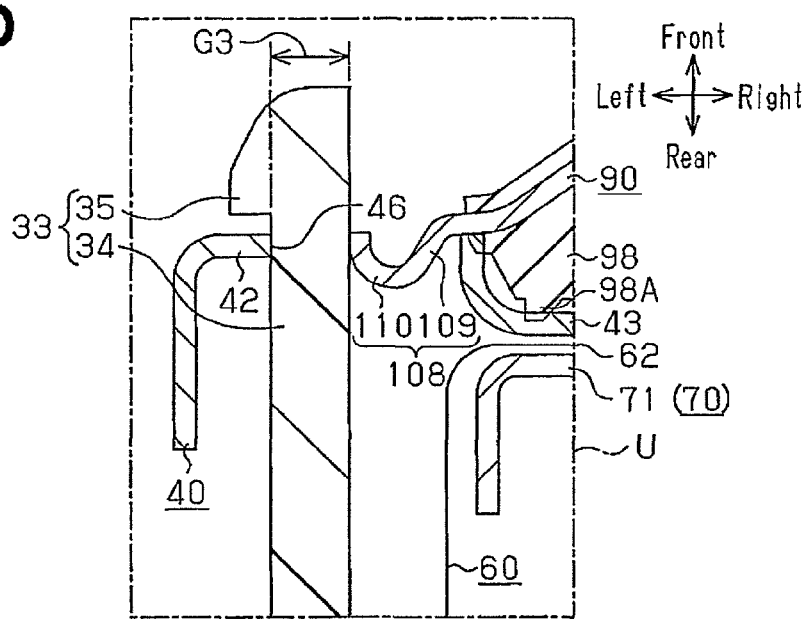
FIG. 10 is an enlarged cross-sectional view illustrating region U of FIG. 9.

As shown in FIGS. 10 and 14, tertiary pressing pieces 108 are formed by bending a middle part in the up-down direction of the left and right sides of the support base 92. More specifically, each tertiary pressing piece 108 has a tertiary inclined portion 109, which is inclined such that the tertiary pressing piece 108 is inclined outward of the support plate 90 in the radial direction of the steering shaft 11 toward the rear end. Each tertiary pressing piece 108 also has a tertiary curved portion 110, which is continuously formed at the rear end of the tertiary inclined portion 109 and curved to bulge rearward. In other words, the tertiary inclined portion 109 is inclined to approach the tertiary securing portion 33 toward the rear end. The distal end (the corner) of each tertiary pressing piece 108 faces forward. Bending of the tertiary pressing pieces 108 is performed with the support plate 90 assembled to the bag holder 40, such that the distal ends (the corners) contact the tertiary securing portions 31 in the tertiary securing holes 46 or in the vicinity thereof. Each tertiary pressing piece 108, which is structured as described above, extends rearward as a whole.

The support plate 90 also has the following functions.

(i) A function to receive the inflator 80 when it is moved forward excessively.

(ii) A function to prevent the harness 87, which is located in front of the inflator 80, from contacting the inflator 80, thereby reducing the likeliness of the vibration of the inflator 80 being hindered by contact with the harness 87.

<Gas Plate 115>

As illustrated in FIGS. 7 and 8, the gas plate 115 is formed to have an annular shape by pressing a metal plate. The gas plate 115 has an attachment base 116 and a pressure receiving portion 117.

The attachment base 116 is substantially annular and is located rearward of the flange 83 of the inflator 80 and in front of the gas ejection holes 82. Fastening through holes 118 are formed at a plurality of (four) positions in the circumferential direction of the attachment base 116 at equal angular intervals (90 degrees). The fastening through holes 118 receive the rear end of the rivets 102.

As indicated by a broken line in which a long dash alternates with a pair of short dashes in FIG. 7, the rear end of each rivet 102 is exposed to the rear from the gas plate 115. The exposed portion of each rivet 102 is collapsed (swaged) as indicated by solid lines in FIG. 7 from the rear. Accordingly, the diameter of the rivet 102 is enlarged, and the rivet 102 is fixed to the flange 83. Also, the enlarged diameter portions of the rivets 102 and the flange 83 hold the attachment base 116 in between. In this manner, the inflator 80, together with the gas plate 115, is fastened to the elastic support portions 101 via the rivets 102. The inflator 80 is elastically supported by the support plate 90 and the bag holder 40 via the elastic support portions 101.

The holes 99 of the support plate 90 are used as insertion holes for a jig (not shown) that receives each rivet 102 from front when the rivet 102 is collapsed.

The gas plate 115 may be fixed to the flange 83 at positions other than positions where the flange 83 is fastened to elastic support portions 101.

In the radial direction of the steering shaft 11, the pressure receiving portion 117 of the gas plate 115 is located between the gas ejection holes 82 of the inflator 80 and the peripheral portion 62 of the airbag 60. The pressure receiving portion 117 is designed to change the direction of the gas G, which has been ejected radially outward of the main body 81 from the gas ejection holes 82, into the rearward direction. The pressure receiving portion 117 also receives the pressure of the gas G to generate forward acting force F. The pressure receiving portion 117 is formed by bending a part of the gas plate 115 at the inner rim of the attachment base 116. The pressure receiving portion 117 is tapered such that the pressure receiving portion 117 is separated farther away from the main body 81 of the inflator 80 toward the rear end.

As described above, the above described airbag apparatus has a vent hole in the airbag 60. The vent hole is originally designed to be located in a front upper portion of the airbag 60 when it is inflated. To cause the vent hole to be located at the position, the following two conditions must be met.

Condition 1: the airbag 60 is held at a predetermined position (rotational phase) relative to the cup retainer 70.

Condition 2: the cup retainer 70, which meets Condition 1, is fastened to the bag holder 40 while being held at a predetermined position (rotational phase).

Even if Condition 1 is met, the vent hole cannot be located at the proper position (front upper part) at inflation of the airbag 60 if the cup retainer 70 is fastened to the bag holder 40 while being held at a wrong position (rotational phase).

That is, as shown in FIG. 15, in the peripheral portion 62 of the airbag 60, the bolt holes 63 are arranged at equal angular intervals about the opening 61. Also, in the bag attachment portion 71 of the cup retainer 70, the bolts 76 to 79 are arranged at equal angular intervals. Therefore, each of the bolts 76 to 79 is possibly inserted in the wrong one of the bolt holes 51 to 54 and fastened. That is, the cup retainer 70 is possibly wrongly assembled to the bag holder 40. In this case, the airbag 60, which is fixed to the cup retainer 70, will be wrongly assembled to the bag holder 40. As a result, the vent hole is possibly located at a position different from the proper position (the front upper part) when the airbag 60 is inflated.

To meet Condition 1, the peripheral portion 62 of the airbag 60 has a check hole 65, which is located at a position away from the bolt hole 63 by a predetermined distance in the circumferential direction. The bag attachment portion 71 of the cup retainer 70 has three match holes 69, each of which is located at a position away from one of the three bolts 77 to 79 by a predetermined distance in the circumferential direction.

One of the match holes 69 matches (communicates) with the check hole 65 when the bolts 76 to 79 are inserted in the bolt holes 63 with the airbag 60 at a position (rotational phase) different from a predetermined position (rotational phase) with respect to the cup retainer 70. In contrast, when the bolts 76 to 79 are inserted into the bolt holes 63 with the airbag 60 in the predetermined position (rotational phase) with respect to the cup retainer 70, none of the match holes 69 matches (communicates) with the check hole 65, and the bag attachment portion 71 of the cup retainer 70 is exposed at the check hole 65. Thus, by checking whether the cup retainer 70 is exposed at the check hole 65, it is possible to check whether the bolts 76 to 79 have been inserted into the bolt holes 63 with the airbag 60 in the predetermined position (rotational phase) with respect to the cup retainer 70.

To meat Condition 2, the bolt holes 51 to 54 of the bag holder 40 are formed at position where all the bolts 76 to 79 of the cup retainer 70 can be inserted when the cup retainer 70 is at a specific rotational phase with respect to the bag holder 40 as shown in FIG. 19.

More specifically, the bolts 76 to 79 include one special bolt 76 and three normal bolts 77 to 79. As shown in FIG. 20A, the distance from the center of the inflator 80, which coincides with the rotation axis L1 of the steering shaft 11, to the axis of the special bolt 76 is indicated by L2, and the distance from the center C to each of the normal bolts 77 to 79 is indicated by L3. The special bolt 76 and the normal bolts 77 to 79 are located at positions where the expression L2>L3 is satisfied.

As shown in FIG. 20B, the bolt holes 51 to 54 include one special bolt hole 51 and three normal bolt holes 52 to 54. The distance from the center C of the inflator 80 to the center of the special bolt hole 51 is set to be the same as the distance L2, and the distance from the center C to each of the normal bolt holes 52 to 54 is set to be the same as the distance L3.

Due to the above described structure of the present embodiment, the normal bolts 77 to 79 and the normal bolt holes 52 to 54 are at positions slightly closer to the center C from reference positions as shown in FIGS. 20A and 20B. Also, the special bolt 76 and the special bolt hole 51 are at positions slightly displaced from reference positions and away from the center C of the inflator 80. The reference positions refer to positions of the bolts and bolt holes of a typical bag holder, in which all the bolts and bolt holes are separated from the center C of the inflator by the same distance. That is, in the present embodiment, the special bolt 76 and the special bolt hole 51 are slightly displaced outward in the radial direction and the normal bolts 77 to 79 and the normal bolt holes 52 to 54 are displaced inward with reference to the bolts and bolt holes in a typical cup retainer and a typical bag holder. The reason for this is as follows. If the normal bolts 77 to 79 and the normal bolt holes 52 to 54 are located at the same positions as the bolts and the bolt holes in a typical retainer and a typical bag holder, and only the special bolt 76 and the special bolt hole 51 are located at positions significantly far away from the center C of the inflator 80, the size of the bag holder 40 and therefore the size of the airbag apparatus will be increased. The above illustrated arrangement of the present embodiment is employed to avoid such increase in size.

Also, one of the bolt holes 51 to 54 is formed to have a smaller diameter than the remainder of the bolt holes 51 to 54. Among the three normal bolt holes 52 to 54 of the present embodiment, the one that is not on the opposite side of the center C of the inflator 80 from the special bolt hole 51, which is the normal bolt hole 54, is formed to have a smaller diameter than the other normal bolt holes 52, 53 and the special bolt hole 51. The bolt holes 51 to 53 other than the normal bolt hole 54 are formed to have the same diameter.

Further, as shown in FIG. 3, the combinations of the bolts 76 to 79 and the bolt holes 51 to 54 and the elastic support portions 101 located nearby are positions that are separated from the center C of the inflator 80 (the rotation axis L1 of the steering shaft 11) substantially by the same distance, but separated from one another in the circumferential direction of the inflator 80.

Operation of the airbag apparatus according to the above described embodiment will now be described.

First, assembly of the airbag apparatus will be described.

Figure 17A:
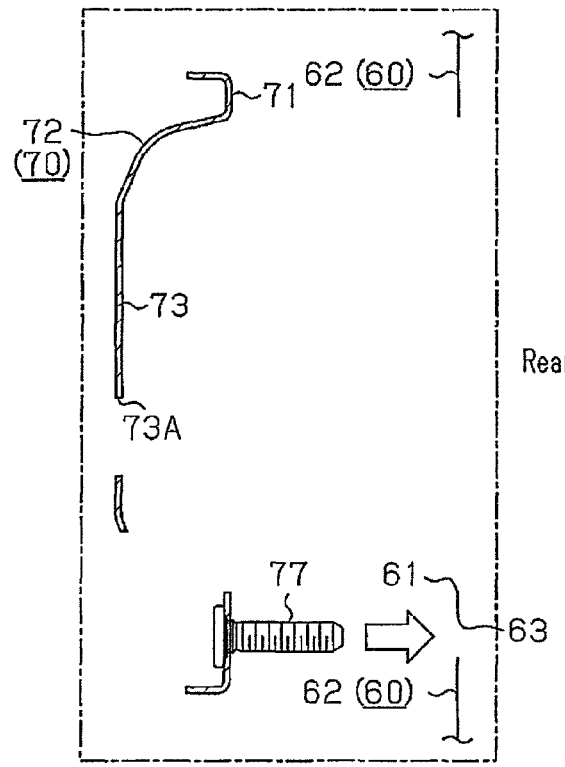
FIG. 17A is a cross-sectional view taken along line 17-17 of FIG. 15, illustrating a state before the airbag is secured to the cup retainer.
Figure 17B:
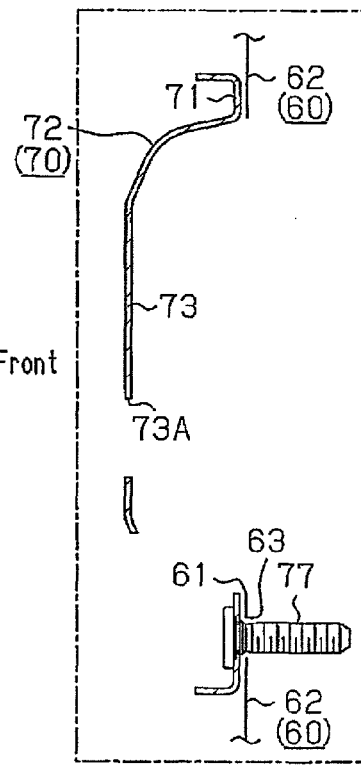
FIG. 17B is a cross-sectional view taken along line 17-17 of FIG. 15, illustrating a state in which the airbag is secured to the cup retainer.

The assembly process involves securing the airbag 60 the cup retainer 70. In the securing process, the airbag 60 in a folded state in inserted via the opening 61 of the opening 61. At this stage, the position of the vent hole is difficult to find, and the position of the airbag (rotational phase) of the airbag 60 is difficult to determine. As shown in FIGS. 15, 17A, and 17B, all the bolts 76 to 79 of the cup retainer 70 are inserted into the bolt holes 63 of the airbag 60. The airbag 60 is secured to the cup retainer 70 via the bolts 76 to 79, which are inserted into the bolt holes 63.

At the insertion of the bolts 76 to 79, since the airbag 60 is formed of flexible fabric, it is possible to change the positional relationship among the four bolt holes 63. Therefore, even if the airbag 60 is not in a predetermined position (rotational phase) with respect to the cup retainer 70, all the bolts 76 to 79 still can be inserted into the bolt holes 63.

Therefore, a continuity test is performed on the check hole 65 to check whether the airbag 60 is in the predetermined position (rotational phase) with respect to the cup retainer 70. In the continuity test, a check needle is inserted into the check hole 65. If any of the match holes 69 is aligned with the check hole 65 and the cup retainer 70 is not exposed at the check hole 65, the needle does not contact the cup retainer 70, so that no current is supplied to the cup retainer 70 from the needle (no continuity). On the basis of the test result, it is determined that the bolts 76 to 79 are inserted in the bolt holes 63 with the airbag 60 at a position (rotational phase) different from the predetermined position (rotational phase) with respect to the cup retainer 70. Also, if none of the match holes 69 is aligned with the check hole 65 and the cup retainer 70 is exposed at the check hole 65 as indicated by broken lines in which a long dash alternates with a pair of short dashes in FIG. 15, the needle contacts the exposed part of the cup retainer 70 via the check hole 65, so that a current is supplied to the cup retainer 70 (continuity present). On the basis of the continuity, it is determined that the bolts 76 to 79 are inserted in the bolt holes 63 with the airbag 60 at the predetermined position (rotational phase) with respect to the cup retainer 70.

Then, only the units in which the continuity has been determined to be present through the continuity test, that is, the units in which the bolts 76 to 79 are inserted in the bolt holes 63 with the airbag 60 at the predetermined position (rotational phase) with respect to the cup retainer 73 are sent to the next process.

Figure 18A:
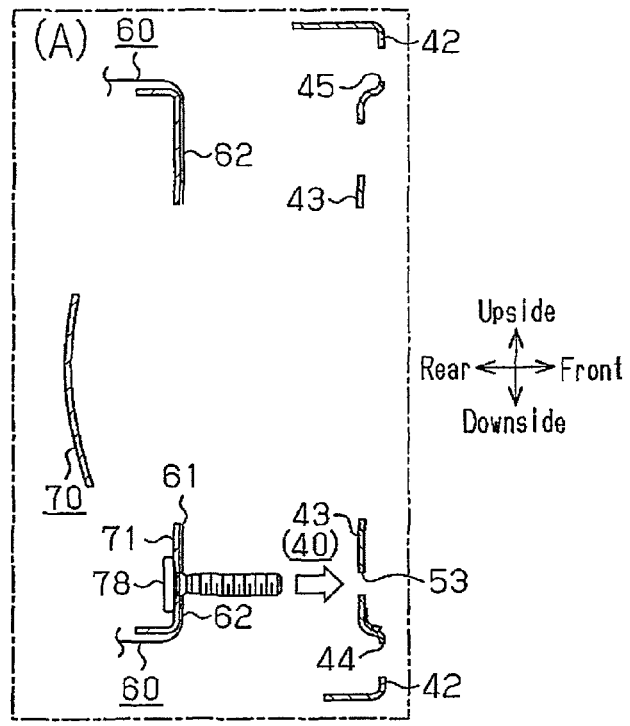
FIG. 18A is a cross-sectional view illustrating a state before the bolt of the cup retainer is inserted into the bolt hole of the bag holder.
Figure 18B:
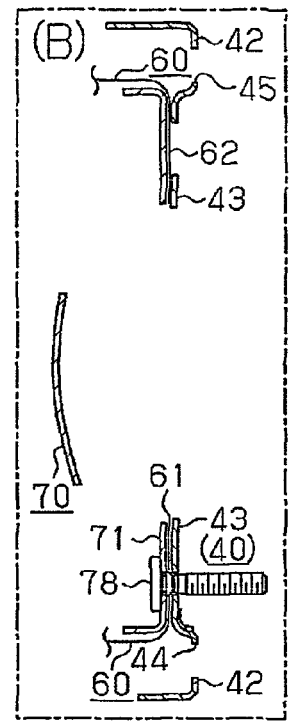
FIG. 18B is a cross-sectional view illustrating a state in which the bolt of the cup retainer is inserted into the bolt hole of the bag holder.

In the next process, as shown in FIGS. 18 to 20, the bolts 76 to 79 of the cup retainer 70 are inserted into the bolt holes 51 to 54 of the bag holder 40. In the process, the cup retainer 70 is rotated relative to the bag holder 40 such that the cup retainer 70 is at a specific rotational phase with respect to the bag holder 40. If the cup retainer 70 is brought to the specific rotational phase with respect to the bag holder 40 through the rotation, the special bolt 76 faces the special bolt hole 51 and the normal bolts 77 to 79 face the normal bolt holes 52 to 54. The amount of interference (the amount of overlap) between the special bolt hole 51 and the special bolt 76 is less than an acceptable value, and the special bolt 76 can be inserted into the special bolt hole 51. The amount of interference (the amount of overlap) between the normal bolt holes 52 to 54 and the normal bolts 77 to 79 is less than an acceptable value, and the normal bolts 77 to 79 can be inserted into the normal bolt holes 52 to 54.

If the cup retainer 70 is brought to a rotational phase different from the specific rotational phase with respect to the bag holder 40 through the rotation, the state is not achieved in which the special bolt 76 faces the special bolt hole 51 and the normal bolts 77 to 79 face the normal bolt holes 52 to 54. This is because the special bolt 75 and the special bolt hole 51 are at positions that are separated from the center C of the inflator 80 by the distance L2, which is longer than the distance L3 from the center C to the normal bolts 77 to 79 and the normal bolt holes 52 to 54.

Unlike the airbag 60, the bag holder 40 is made of a hard metal plate. Thus, it is difficult (virtually impossible) to deform the bag holder 40 to change the positional relationship between the special bolt hole 51 and the normal bolt holes 52 to 54. Therefore, the amount of interference (the amount of overlap) surpasses the acceptable value in at least one of the combinations of the bolt holes 51 to 54 and the bolts 76 to 79. It is difficult (virtually impossible) to insert the special bolt 76 into the special bolt hole 51 and insert the normal bolts 77 to 79 into the normal bolt holes 52 to 54. As a result, it is unlikely that the special bolt 76 is inserted into the special bolt hole 51 and the normal bolts 77 to 79 are inserted into the normal bolts 52 to 54 when the cup retainer 70 is not at the specific rotational phase with respect to the bag holder 40. That is, a wrong assembly is unlikely to be carried out.

When the cup retainer 70 is brought to the specific rotation phase with respect to the bag holder 40 through the above described rotation of the cup retainer 70, and the special bolt 76 and the normal bolts 77 to 79 are inserted into the special bolt hole 51 and the normal bolt holes 52 to 54, respectively, the cup retainer 70 is assembled to the bag holder 40 at the proper position (rotational phase).

Suppose that the bolt holes 51 to 54 have the same diameter. If the cup retainer 70 is at a rotational phase different from the specific rotation phase with respect to the bag holder 40, not all the bolt holes 51 to 54 originally face all the bolts 76 to 79. Therefore, the amount of interference (the amount of overlap) surpasses the acceptable value in at least one of the combinations of the bolt holes 51 to 54 and the bolts 76 to 79. This makes it difficult for the bolts 76 to 79 to be inserted into the bolt holes 51 to 54.

However, depending on the tolerance of the diameter of the bolt holes 51 to 54 and the tolerance of the positions of the bolts 76 to 79 in the cup retainer 70, all the bolt holes 51 to 54 possibly face all the bolts 76 to 79. Therefore, the amount of interference (the amount of overlap) might be less than the acceptable value in all the possible combinations of the bolt holes 51 to 54 and the bolts 76 to 79, the bolts 76 to 79 can be inserted into the bolt holes 51 to 54 in all the possible combinations.

Even in such a case, one of the bolt holes 51 to 54 (the normal bolt hole 54) of the present embodiment is formed to have a smaller diameter than the remainder (the special bolt hole 51 and the normal bolt holes 52, 53). Thus, the amount of interference (the amount overlap) between the bolt holes 51 to 54 and the bolts 76 to 79 surpasses the acceptable value, making it difficult for the bolts 76 to 79 to be inserted into the bolt holes 51 to 54. As a result, the cup retainer 70 is less likely to be wrongly assembled to the bag holder 40.

When the special bolt 76 is inserted into the special bolt hole 51 and the normal bolts 77 to 79 are inserted into the normal bolt holes 52 to 54 as described above, the bag attachment portion 71 of the cup retainer 70 and the peripheral portion 62 of the airbag 60 are caused to approach the step 43 of the bag holder 40. Accordingly, the peripheral portion 62 is held between the step 43 and the bag attachment portion 71.

Figure 21:
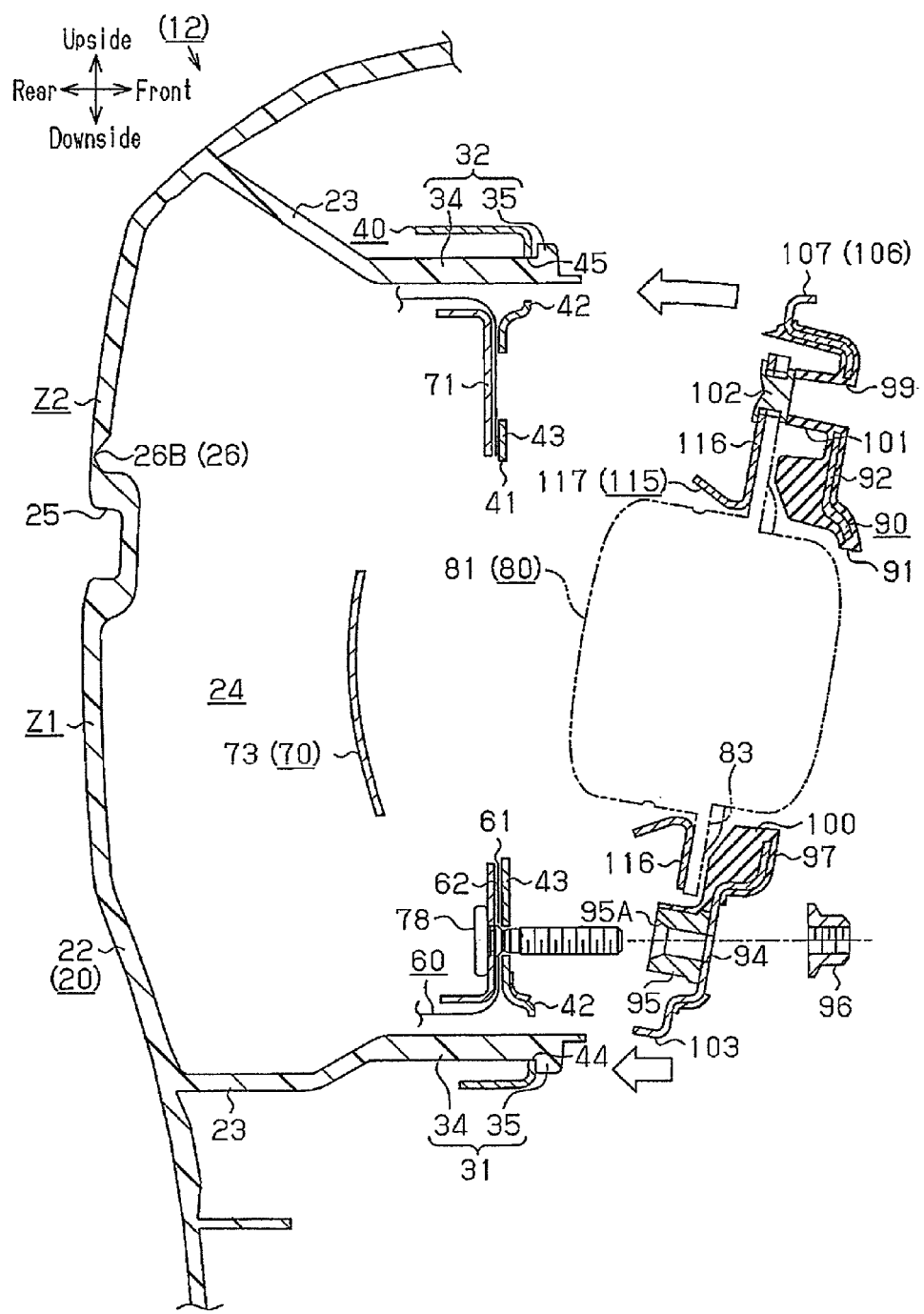
FIG. 21 is a cross-sectional view that corresponds to FIG. 4, illustrating a state before the support plate is assembled to the bag holder.

Subsequently, a process performed for temporarily joining the pad cover 20 to the bag holder 40 as shown in FIGS. 21 and 22. In this process, the two primary securing portions 31 are inserted into the primary securing holes 44, the two the secondary securing portions 32 are inserted into the secondary securing holes 45, and the tertiary securing portions 33 are inserted into the tertiary securing holes 46. The insertion is performed until the claw portions 35 are moved to positions forward of the base portion 42 of the bag holder 40, so that the pad cover 20 is temporarily joined to the bag holder 40.

Next, a process is performed for assembling the support plate 90 to the bag holder 40. The support plate 90, which is employed in the assembly, is formed by elastically supporting the inflator 80 and the gas plate 115 by the elastic support portions 101. At the assembly, the support plate 90 is brought closer to the bag holder 40 from front as indicated by the lower arrow in FIG. 21. Each primary pressing piece 103 is brought into contact with the corresponding one of the primary securing portions 31, and each secondary pressing piece 106 is brought into contact with the corresponding one of the secondary securing portions 32.

The direction in which the support plate 90 is brought close to the bag holder 40 will be referred to as assembling direction. The distal end (corner) of each primary pressing piece 103, which faces rearward in the assembling direction, is likely to interfere with the corresponding primary securing portion 31. In contrast, the distal end (corner) of each secondary pressing piece 106, which faces forward in the direction opposite the assembling direction, is unlikely to interfere with the corresponding secondary securing portion 32. Therefore, compared to a case in which the distal ends (corners) of the pressing pieces 103, 106 face rearward, or in the assembling direction, the likeliness of the pressing pieces 103, 106 interfering with the securing portions 31, 32, which occurs when the support plate 90 is brought close to the bag holder 40, is reduced.

The degree of interference of each primary pressing piece 103 with the corresponding primary securing portion 31 is increased when the process for bringing the primary pressing pieces 103 into contact with the primary securing portions 31 is performed at the same time as or after the process for bringing the secondary pressing pieces 106 into contact with the secondary securing portions 32. This is because when the secondary pressing pieces 106 contact the secondary securing portions 32, the range of movement of each primary pressing piece 103 is limited and narrow.

In this respect, at the assembly of the support plate 90 to the bag holder 40 in the present embodiment, the support plate 90 is first brought into an inclined position such that the primary pressing pieces 103 are closer to the bag holder 40 than the secondary pressing pieces 106. When the inclined support plate 90 is brought close to the bag holder 40 while maintaining the inclined position, the primary pressing pieces 103 contact the primary securing portions 31 before the secondary pressing pieces 106 contact the secondary securing portions 32. At this time, the degree of interference of the distal end (corner) of each primary pressing piece 103 with the corresponding primary securing portion 31 is small. This is because when the secondary pressing pieces 106 do not contact the secondary securing portions 32, the range of movement of each primary pressing piece 103 is wide.

When the support plate 90 is inclined, each primary pressing piece 103 is inclined such that the primary pressing piece 103 approaches, with respect to the radial direction of the steering shaft 11, the center of the support plate 90 (upper end as viewed in FIG. 21), that is, further away from the primary securing portions 31, toward the rear end. Therefore, each primary pressing piece 103 contacts the corresponding primary securing portion 31 not at the distal end (corner), but at a position forward of the distal end. Thus, the distal end (corner) of the primary pressing pieces 103 is unlikely to interfere with the primary securing portions 31.

Next, using as a fulcrum a part of each primary pressing piece 103 that contacts the corresponding primary securing portion 31, the inclined support plate 90 is rotated (rearward) toward the bag holder 40 as indicated by the upper arrow in FIG. 21. At the rotation, the secondary pressing pieces 106 and the tertiary pressing pieces 108 (see FIG. 22) approach the bag holder 40.

During the rotation of the support plate 90, the collars 95 fixed to the support plate 90 approach the bolts 76 to 79 fixed to the cup retainer 70 and are inserted into the collars 95. At this time, since the rear part of the inner circumferential surface each collar 95 is formed by the tapered surface 95A having a diameter increasing toward the rear end, the bolts 76 to 79 are more easily enter the collars 95 compared to a case in which no tapered surfaces 95A are provided.

During the rotation of the support plate 90, the main body 81 of the inflator 80 and the pressure receiving portion 117 of the gas plate 115 are inserted into the insertion hole 41 of the bag holder 40, the opening 61 of the airbag 60, and the cup retainer 70. Also, as shown in FIGS. 9 and 10, the left and right tertiary pressing pieces 108 are inserted into the tertiary securing holes 46.

At this time, although each the tertiary pressing piece 108 extends rearward as a whole, its distal end (corner) faces forward, which is the direction opposite to the assembling direction. Therefore, the distal end (corner) of each tertiary pressing piece 108 is less likely to interfere with the tertiary securing portion 33 compared to a case in which the distal end faces rearward. Also, in each tertiary pressing piece 108, the tertiary curved portion 110 is located on the leading side of the distal end (corner) in the rotation direction of the support plate 90, but is curved to bulge rearward. Thus, the tertiary curved portions 110 is unlikely to interfere with the tertiary securing portions 33 while the support plate 90 is rotated.

At the ends of the tertiary curved portions 110, the inserted tertiary pressing pieces 108 elastically contact the tertiary securing portions 33 from inside in the radial direction of the steering shaft 11, thereby pushing the tertiary securing portions 33 against the inner wall of the tertiary securing holes 46.

When the support plate 90 is rotated further with each primary pressing piece 103 contacting the corresponding the primary securing portion 31, the secondary pressing pieces 106 contact the secondary securing portions 32 as shown in FIGS. 4 and 6. At this time, since the distal ends (corners) of the secondary pressing pieces 106 face forward as described above, the distal ends are unlikely to interfere with the secondary securing portions 32. Also, in each secondary pressing piece 106, the secondary inclined portion 107 is inclined such that the secondary pressing piece 106 is inclined outward of the support plate 90 in the radial direction of the steering shaft 11 (to approach the secondary securing portion 32), toward the front end. In other words, the secondary inclined portion 107 is inclined such that the space between the secondary inclined portion 107 and the secondary securing portion 32 increases toward the rear end. Therefore, each secondary pressing piece 106 contacts the corresponding secondary securing portion 32 not at the rear end, but at the front end. Thus, the rear end of each secondary inclined portion 107 is prevented from interfering with the corresponding secondary securing portion 32.

As described above, each primary pressing piece 103 is easily brought into contact with the corresponding one of the primary securing portions 31, and each secondary pressing piece 106 is easily brought into contact with the corresponding one of the secondary securing portions 32. The contacting is achieved against the elasticity of the securing portions 31 to 33, so that the primary securing portions 31 are pressed against the inner walls of the primary securing holes 44, and the secondary securing portions 32 are pressed against the inner walls of the secondary securing holes 45. That is, when the primary pressing pieces 103 are pressed against the primary securing portions 31 from inside in the radial direction of the steering shaft 11, the primary securing portions 31 are pressed against the inner walls of the primary securing holes 44. Also, when the ends of the secondary inclined portions 107 of the secondary pressing pieces 106 are pressed against the secondary securing portions 32 from inside in the radial direction of the steering shaft 11, the secondary securing portions 32 are pressed against the inner walls of the secondary securing holes 45.

Substantially at the same time as when the secondary pressing pieces 106 contact the secondary securing portions 32, each tertiary pressing piece 10 substantially entirely enters the corresponding tertiary securing hole 46, so that the tertiary securing portion 33 is pressed against the inner wall of the tertiary securing hole 46.

Also, as shown in FIGS. 12 and 13, the sealing portion 98, which extends rearward from the support plate 90, contacts the step 43 of the bag holder 40 at the sealing protrusions 98A. If the support plate 90 continues being rotated thereafter, the sealing protrusions 98A are elastically deformed (crushed) and elastically contact the step 43.

The hard support plate 90, which is made of a metal plate, contacts the contact portion 47 of the hard base portion 42, which is mad of a metal plate, so that a further rotation of the support plate 90 is restricted, and the position of the support plate 90 along the steering shaft 11 (in the front-rear direction) is determined. The position determination, which is carried out through metal-to-metal contact, ensures higher accuracy than in a case where the support plate 90 contact the contact portion 47 in the elastic sealing portion 98 (the sealing protrusions 98A).

Particularly, in the present embodiment, since in the contact portion 47 of the base portion 42 and a part of the support plate 90 that is forward of the contact portion 47 are both formed into a flat plate that is substantially orthogonal to the rotation axis L1 of the steering shaft 11, the contact portion 47 and the support plate 90 contact each other over a relatively large area. This allows the position of the support plate 90 to be more accurately determined.

When the above described position determination is complete, each primary pressing piece 103 elastically contacts the primary securing portion 31 within the primary securing holes 44 or in the vicinity thereof, thereby pressing the primary securing portion 31 against the inner wall of the primary securing hole 44. Each primary pressing piece 103 restricts the corresponding primary securing portion 31 from being flexed inward in the radial direction of the steering shaft 11, thereby maintaining the claw portion 35 of the primary securing portion 31 to be secured to the primary securing hole 44.

Also, each secondary pressing piece 106 elastically contacts the corresponding secondary securing portion 32 at the distal end (corner) of the secondary inclined portion 107 as shown in FIG. 6, thereby pressing the secondary securing portion 32 against the inner wall of the secondary securing hole 45. Each secondary pressing piece 106 restricts the corresponding secondary securing portion 32 from being flexed inward in the radial direction of the steering shaft 11, thereby maintaining the claw portion 35 of the secondary securing portion 32 to be secured to the secondary securing hole 45.

Further, each tertiary pressing piece 108 elastically contacts, at the end of the tertiary curved portion 110, the corresponding tertiary securing portion 33 from inside in the radial direction, thereby pushing the tertiary securing portion 33 against the inner wall of the tertiary securing hole 46. Each tertiary pressing piece 108 restricts the corresponding tertiary securing portion 33 from being flexed inward in the radial direction of the steering shaft 11, thereby maintaining the claw portion 35 of the tertiary securing portion 33 to be secured to the tertiary securing hole 46.

As shown in FIG. 8, the bolts 76 to 79 are passed through the collars 95 and the bolt holes 94, so that the distal ends of the bolt 76 to 79 are exposed from the support plate 90. The nuts 96 are fastened to the exposed portions of the bolts 76 to 79 to assemble the support plate 90 to the bag holder 40, so that the airbag apparatus is incorporated in the steering wheel 12.

In this airbag apparatus, the inflator 80 is elastically supported by the bag holder 40 via the elastic support portions 101 and the support plate 90.

In the above described airbag apparatus, the bolts 76 to 79 and the bolt holes 51 to 54 for fastening the cup retainer 70 and the bag holder 40 to each other, and the elastic support portions 101 for elastically supporting the inflator 80 influence the dimension of the inflator in the radial direction. As the bolts 76 to 79 and the bolt holes 51 to 54 are separated further from the elastic support portions 101 in the radial direction, the size of the airbag apparatus tends to be increased in the radial direction.

In this respect, i) the bolts 76 to 79 and the bolt holes 51 to 54 and ii) the elastic support portions 101, which is located in the vicinity of i), are at positions substantially of the same distance from the center C of the inflator 80. Such a positional relationship is achieved by arranging the elastic support portions 101 at positions separated from the bolts 76 to 79 and the bolt holes 51 to 54 in the circumferential direction of the inflator 80. The interference is avoided between i) the elastic support portions 101 and ii) the bolts 76 to 79 and the bolt holes 51 to 54.

Thus, the dimension of the airbag apparatus in the radial direction of the steering shaft 11 is smaller than that in a case where i) the bolts 76 to 79 and the bolt holes 51 to 54 and ii) the elastic support portions 101 are at different distance positions from the center of the inflator 80.

Next, operation of the airbag apparatus and the steering wheel 12, which incorporates the airbag apparatus, will be described.

According to the steering wheel 12 of the present embodiment, when the driver presses the pad cover 20 shown in FIG. 12 forward, the bag holder 40 is displaced forward together with other components of the airbag apparatus. Accordingly, the circuit of the horn switch mechanism HS is closed to activate the horn device to generate sound.

Unless impact is applied to the vehicle from front (frontal collision), the gas G is not ejected from the gas ejection holes 82 of the inflator 80, and the airbag 60 remains folded.

When the vehicle is traveling at a high speed or the engine is idling with the airbag 60 in a non-inflated state, vibration in the up-down direction and left-right direction may be transmitted through the steering shaft 11. The vibration is transmitted to the inflator 80 via the bag holder 40, the elastic support portions 101 and others in the airbag apparatus. At this time, as shown in FIGS. 7 and 8, the flange 83 of the inflator 80 is separated rearward from the elastic protrusion 100 of the support plate 90, and the clearance between the flange 83 and the elastic protrusion 100 allows the inflator 80 to vibrate.

In response to the vibration, the inflator 80 functions as the damper mass of a dynamic damper, and the elastic support portions 101 of the support plate 90 function as the springs of the dynamic damper.

For example, if the steering wheel 12 vibrates in the up-down direction at a certain frequency, the elastic support portions 101 are elastically deformed at the same or similar frequency, while vibrating (resonating) in the up-down direction with the inflator 80 and the gas plate 115, which is integrated with the inflator 80, thereby absorbing the vibration energy in the up-down direction of the steering wheel 12. This suppresses the vibration of the steering wheel 12 in the up-down direction.

Also, if the steering wheel 12 vibrates in the left-right direction at a certain frequency, the elastic support portions 101 are elastically deformed at the same or similar frequency, while vibrating in the left-right direction with the inflator 80 and the gas plate 115, which is integrated with the inflator 80, thereby absorbing the vibration energy in the left-right direction of the steering wheel 12. This suppresses the vibration of the steering wheel 12 in the left-right direction.

In this manner, vibrations both in the up-down direction and the left-right direction of the steering wheel 12 can be suppressed.

In the airbag apparatus, as shown in FIG. 9, the arch portions 72 of the cup retainer 70 are arranged outward of the inflator 80 in the radial direction of the steering shaft 11. In other words, the arch portions 72 of the cup retainer 70 are located between the inflator 80 and the airbag 50 with respect to the radial direction. The arch portions 72 restrict movement of the airbag 60 in the radial direction in the non-inflated state of the airbag 60, and reduce interference between the airbag 60 and the inflator 80. Also, the cover portion 73 of the cup retainer 70 is arranged behind the inflator 80. The cover portion 73 restricts forward movement of the airbag 60 in the non-inflated state of the airbag 60, and reduces interference between the airbag 60 and the inflator 80. Therefore, vibration of the inflator 80 is unlikely to be hindered by the airbag 60.

Incidentally, when an impact is applied to the vehicle, for example, due to a frontal collision, the body of the driver acts to incline forward due to the inertia. At the same time, the inflator 80 of the airbag apparatus is activated in response to the impact, so that the gas G is ejected radially outward from the gas ejection holes 82.

The ejected gas G hits the pressure receiving portion 117, which is inclined to be separated from the main body 61 toward the rear end, so that the direction of flow is changed from a radially outward direction with respect to the steering shaft 11 to the rearward direction, as indicated by the arrow of the solid line in FIGS. 7 and 8. After its flowing direction is changed, the gas G is supplied to the interior or the airbag 60. The gas G causes the airbag 60 to inflate rearward (toward the driver) while being unfolded (deployed). The airbag 60 being deployed and inflated applies rearward pressing force to the lid 22 of the pad cover 20. The deployment and the inflation of the airbag 60 is restricted until the lid 22 is broken at the tear line 26.

The pressure of the gas G from the gas ejection holes 82 is received by the inclined pressure receiving portion 117, 50 that a forward force F is generated in the pressure receiving portion 117 as indicated by the blank arrows in FIGS. 7 and 8. Immediately after the gas G starts being ejected from the gas ejection holes 82, the force F moves the inflator 80 forward, so that the inflator 80 elastically deforms the elastic support portions 101 and then contacts the elastic protrusion 100. Accordingly, the clearance between the inflator 60 and the support plate 90 is sealed to reduce leakage of gas through the through hole 91.

When the airbag 60 is inflated inside the pad portion (the space between the pad cover 20 and the lower cover 14), the inflation is limited by the pad portion. The internal pressure of the airbag 60 is therefore rapidly raised as time elapses. The gas G applies forward moving force to the inflator 80. The forward moving force and the above described force F of the pressure receiving portion 117 cause the inflator 80 to be strongly pressed against the elastic protrusion 100. The internal pressure of the airbag 60 is maximized immediately before the airbag 60 pops out of the pad portion.

When the pressing force acting on the lid 22 of the pad cover 20 is increased by the airbag 60 being deployed and inflated, the lid 22 is broken at the tear line 26. Then, as indicated by broken lines in which a long dash alternates with a pair of short dashes, the first zone Z1 is opened downward (rotated) at the hinge portion 27 serving as a fulcrum, and the second zone Z2 is opened upward (rotated) at the hinge portion 28 serving as a fulcrum.

At this time, the rearward force applied to the pad cover 20 from the airbag 60 is greater in the first zone Z1 than in the second zone Z2. This is because the first zone Z1 is larger than the second zone Z2 (see FIG. 2).

The force applied to the first zone Z1 from the airbag 60 is in turn transmitted to the primary securing portions 31, which are located in front of the first zone Z1. A great rearward load is applied to positions at which the primary securing portions 31 are secured to the primary securing holes 44. Thus, to prevent the primary securing portions 31 from being removed from the primary securing holes 44, it is required that the primary securing portions 31 be strongly pressed against the inner walls of the primary securing holes 44 by the primary pressing pieces 103, that is, the primary securing portions 31 be fastened to the primary securing holes 44 by a great fastening force.

Also, the force applied to the second zone Z2 from the airbag 60 is transmitted to the secondary securing portions 32, which are located in front of the second zone Z2. A small rearward load is applied to positions at which the secondary securing portions 32 are secured to the secondary securing holes 45. Thus, to prevent the secondary securing portions 32 from being removed from the secondary securing holes 45, the force applied by the secondary pressing pieces 106 to press the secondary securing portions 32 against the inner walls of the secondary securing holes 45 is not required to be as great as the force applied by the primary pressing pieces 103 to press the primary securing portions 31 against the inner walls of the primary securing holes 44. That is, the force by which the secondary securing portions 32 are fastened to the secondary securing holes 45 does not need to be as great as the force by which the primary securing portions 31 are fastened to the primary securing holes 44.

The smaller the clearance between the inner walls of the securing holes 44 to 46, against which the securing portions 31 to 33 are pressed, and the pressing pieces 103, 106, and 108, the greater the force by which the securing portions 31 to 33 are fastened to the securing holes 44 to 46 becomes.

In this respect, as indicated by broken lines in which a long dash alternates with a pair of short dashes in FIG. 5, a clearance G1 between each primary pressing piece 103, which extends rearward, and the inner wall of the corresponding primary securing hole 44 is smaller than a clearance G1A between the primary pressing piece 103 and the primary securing hole 44 in a case in which the primary pressing piece 103 extends forward. Therefore, the fastening force of the primary securing portion 31 acting on the primary securing hole 44 is greater than in the case in which the primary pressing piece 103 extends forward, and is appropriate for the load acting on the parts at which the primary securing portion 31 is secured to the primary securing hole 44 when the first zone Z1 is opened. Therefore, the primary securing portions 31 are prevented from being removed from the primary securing holes 44 by a fastening force of an appropriate magnitude.

In contrast, as shown in FIG. 6, in each secondary pressing piece 106, which extends forward, a clearance G2 between the distal end (corner) of the secondary inclined portion 107 and the inner wall of the secondary securing hole 45 is greater than the clearance G1. Therefore, the fastening force of the secondary securing portion 32 acting on the secondary securing hole 45 is smaller than the fastening force of the primary securing portion 31 acting on the primary securing hole 44, but is appropriate for the load acting on the parts at which the secondary securing portion 32 is secured to the secondary securing hole 45 when the second zone Z2 is opened. Therefore, the secondary securing portions 32 are prevented from being removed from the secondary securing holes 45 by a fastening force of an appropriate magnitude.

Also, as shown in FIG. 10, in each tertiary pressing piece 108, a clearance G3 between the distal end of the tertiary curved portion 110 and the inner wall of the tertiary securing hole 46 is small like the clearance G1. Therefore, the fastening force of the tertiary securing portion 33 acting on the tertiary securing hole 46 is great. Therefore, the tertiary securing portions 33 are prevented from being removed from the tertiary securing holes 46 by a fastening force of an appropriate magnitude.

When the first zone Z1 is opened downward and the second zone Z2 is opened upward as described above, an opening 36 is formed between the zones Z1 and Z2. The airbag 60 continues being deployed and inflated rearward through the opening 36. The airbag 60 is thus deployed and inflated in front of the body of the driver, which acts to incline forward due to the impact of the frontal collision, and receives the body of the driver to limit the forward inclining motion of the driver, thereby protecting the driver from the impact.

When the airbag 60, the internal pressure of which has been increased, breaks the lid 22 and pops out of the pad cover 20, the pad portion no longer limits the inflation. This allows the airbag 60 to be rapidly inflated, so that the internal pressure of the airbag 60 rapidly drops to a negative pressure (a pressure lower than the atmospheric pressure).

At this time also, the pressure of the gas G ejected from the gas ejection holes 82 is received by the pressure receiving portion 117 so that a forward force F is generated. However, the force F is smaller than the force of the negative pressure acting to move the inflator 90 rearward. Thus, the elastic restoring force of the elastic support portions 101 moves the inflator 80 rearward to temporarily separate the flange 83 from the elastic protrusion 100 of the support plate 90, so that a clearance is formed between the flange 83 and the elastic protrusion 100.

However, the gas C ejected from the gas ejection holes 82 continuously hits the pressure receiving portion 117 to be redirected. The redirected gas G causes the air outside the airbag 60 to be drawn into the airbag 60 through the clearance. An air flow from the outside to the interior of the airbag 60 is crated in the clearance between the flange 83 and the elastic protrusion 100. Therefore, even if there is a clearance, the gas G in the airbag 60 does not leak from the through hole 91 via the clearance.

As the internal pressure of the airbag 60 is raised by continuous supply of the gas C to the airbag 60 in turn increases the force that acts to move the inflator 80 forward. The inflator 80 thus contacts the support plate 90 again at the elastic protrusion 100, thereby limiting gas leakage from the through hole 91.

Some of the gas G ejected from the gas ejection holes 82 hits the pressure receiving portion 117 before reaching the fixed portion of the airbag 60, and is redirected rearward. Accordingly, the gas G is less likely to directly contact the part of the airbag 60 that is fixed to the bag holder 40 (the peripheral portion 62).

The gas plate 115 is formed integrally with the flange 83 of the inflator 80. Thus, regardless of the position of the inflator 80, the pressure receiving portion 117 is always located at a position close to the outer side of the gas ejection holes 82 with respect to the radial direction of the steering shaft 11. Therefore, regardless of the position of the inflator 80, the gas G ejected from the gas ejection holes 82 hits the pressure receiving portion 117. This allows the functions for redirecting the gas G and generating the forward force F to be effectively exerted.

A part of the gas G ejected by the inflator 80 tends to leak to the outside of the airbag apparatus through between the support plate 90 and the bag holder 40. However, as shown in FIG. 13, the sealing protrusions 98A of the sealing portion 98 elastically contact the hag holder 40 to restrict such leakage of the gas G.

As the airbag 60 presses the pad cover 20 rearward, parts of the bag holder 40 that are secured to the securing portions 31 to 33 of the pad cover 20 (parts around the securing holes 44 to 46) receive rearward force (tension) and are likely to be deformed. The bag holder 40, which includes the base portion 42 and the step 43, receives the rearward force (tension) that acts on the base portion 42. The base portion 42 is therefore likely to be deformed. In contrast, the step 43 is less likely to be deformed. One of the reasons for this is that the step 43 is separated from the base portion 42 in the radial direction of the steering shaft 11, so that the rearward force (tension) is unlikely to be transmitted to the step 43. Also, since the step 43 is located at position different from the base portion 42 in the direction along the steering shaft 11 (behind the base portion 42), so that the rigidity is increased. In the present embodiment, the sealing protrusions 98A of the sealing portion 96 contact the step 43, which resists deformation. Accordingly, regardless of deformation of the base portion 42 due to inflation of the airbag 60, the gas G ejected by the inflator 80 is unlikely to leak through between the support plate 90 and the bag holder 40.

When exposed to the gas G, the peripheral portion 62 of the airbag 60 is easily affected by the heat of the gas G. In this regard, the cup retainer 70 of the present embodiment includes the bag encompassing portion 74 as shown in FIG. 6, which extends inward from the inner rim of the bag attachment portion 71 with respect to the radial direction of the steering shaft 11, thereby covering the peripheral portion 62 of the opening 61 in the airbag 60. Thus, compared to a case in which the bag encompassing portion 74 is not provided, the peripheral portion 62 of the airbag 60 is less likely to be exposed. The peripheral portion 62 is therefore unlikely to be exposed to high-temperature gas G and affected by the heat of the gas G.

Particularly, in the present embodiment, the arch portions 72 of the cup retainer 70 are arranged at positions separated in the circumferential direction form parts of the bag attachment portion 71 that are fastened to the bag holder 40 by means of the bolts 76 to 79. The bag encompassing portions 74 are thus each arranged at the inner rim of the bag attachment portion 71 and over the entire area between an adjacent pair of the arch portions 72. Therefore, wide areas in the circumferential direction of the peripheral portion 62 of the airbag 60 bare covered with the bag encompassing portion 74, which prevents large areas of the peripheral portion 62 from being affected by the heat of the gas G.

Also, since the bag encompassing portions 74 are each arranged substantially the entire area between an adjacent pair of the arch portions 72 as described above, the bag encompassing portion 74 also covers parts in the peripheral portion 62 that are in the vicinity of the parts of the bag attachment portion 71 that are fastened to the bag holder 40 by means of the bolts 76 to 79.

Therefore, compared to a case in which the bag encompassing portion 74 is provided at a position that is located at the inner rim of the bag attachment portion 71 but does not correspond to the portions fastened to the bag holder 40, the peripheral portion 62 of the airbag 60 is less likely to be exposed at the fastened portions and therefore unlikely to be exposed to high-temperature gas G. As a result, the parts of the peripheral portion 62 of the airbag 60 that are fastened to the bag holder 40 of the bag attachment portion 71 are unlikely to be affected by the heat of the gas G, so that the airbag 60 is maintained to be attached to the bag holder 40.

The present embodiment described above has the following advantages.

(1) The cup retainer 70 includes the arch portions 72, extend rearward from the inner rim of the annular bag attachment portion 71 and cover the inflator 80 from the outside with respect to the radial direction of the steering shaft 11, and the bag encompassing portion 74, which extends radially inward from the inner rim of the bag attachment portion 71 to cover the peripheral portion 62 of the airbag 60 (FIG. 8). While preventing vibration of the inflator 80 from hindered by the airbag 60, the peripheral portion 62 of the airbag 60 is prevented from being affected by the heat of the gas G ejected by the inflator 80.

(2) The bag encompassing portion 74 is arranged on the inner rim of the bag attachment portion 71. More specifically, the bag encompassing portion 74 is located at least at parts of the bag attachment portion 71 that are fastened to the bag holder 40 by means of the bolts 76 to 79 (FIGS. 8 and 11). Therefore, the parts of the peripheral portion 62 of the airbag 60 that are fastened to the bag holder 40 of the bag attachment portion 71 are unlikely to be affected by the heat of the gas 5, so that the airbag 60 is maintained to be attached to the bag holder 40.

(3) The arch portions 72 are arranged at positions separated in the circumferential direction from parts of the bag attachment portion 71 that are fastened to the bag holder 40 by means of the bolts 76 to 79. The bag encompassing portions 74 are thus each arranged at the inner rim of the bag attachment portion 71 and over the entire area between an adjacent pair of the arch portions 72 (FIG. 11). Therefore, wide areas in the circumferential direction of the peripheral portion 62 of the airbag 60 bare covered with the bag encompassing portion 74, which prevents large areas of the peripheral portion 62 from being affected by the heat of the gas G. The areas include parts of the bag attachment portion 71 that are fastened to the bag holder 40 by means of the bolts 76 to 79, so that the advantage of the item (2) is achieved.

The present invention may be embodied in the following forms.

<Regarding Retainer>

As long as the retainer has the bag attachment portion 71, the arch portions 72, and the bag encompassing portion 74, the cover portion 73 may be omitted.

The shape and size of the bag encompassing portions 74 may be changed as necessary as long as the bag encompassing portions 74 extend inward in the radial direction of the steering shaft 11 from the inner rim of the bag attachment portion 71 to cover the peripheral portion 62 of the airbag 60. For example, the bag encompassing portion 74, which is arranged on the inner rim of the bag attachment portion 71, may be located only at parts of the bag attachment portion 71 that are fastened to the bag holder 40 by means of the bolts 76 to 79.

<Regarding Inflator 80>

The main body 81 of the inflator 80 may have any tubular shape other than a cylindrical shape.

<Regarding Support Plate 90>

The pressing pieces 103, 106, 108 of the support plate 90 do not necessarily have to contact the securing portions 31 to 33 from inside in the radial direction of the steering shaft 11, but may contact the securing portions 31 to 33 from outside in the same direction.

<Regarding Elastic Support Portions 101>

The elastic support portions 101 may be located at positions in the support plate 90 that are different from those described in the above embodiment. The number of the elastic support portions 101 in the support plate 90 may be changed.

The elastic support portions 101 do not necessarily need to have a cylindrical shape, but may have any tubular shape such as a conical tubular shape.

<Regarding Pressure Receiving Portion 117>

The pressure receiving portion 117 may be formed as a part of the flange 83 in the inflator 80.

The pressure receiving portion 117 may be directly attached to the inflator 80. For example, a recess may be formed on the outer circumferential surface of the main body 81 of the inflator 80 and at a position forward of the gas ejection holes 82, and the attachment base 116 of the gas plate 115 may be received (inserted or press fitted) by the recess, so that the pressure receiving portion 117 is attached to the inflator 80.

In this case, the recess may be formed by a groove that extends in the circumferential direction of the main body 81. The groove may be formed in the entire circumference of the main body 81. The recess may be formed by a plurality of holes formed at positions separated from one another in the circumferential direction of the main body 81.

<Other Modifications>

At least one of the bag holder 40, the cup retainer 70, the support plate 90, and the gas plate 115 may be formed by a method other than pressing, for example, by die casting.

The present invention may be applied not only to the airbag apparatus installed in motor vehicles, but may also be applied to airbag apparatuses installed in steering wheels of other transport vehicles such as aircrafts and ships. Motor vehicles include not only passenger vehicles, but also industrial vehicles of various types.

The invention claimed is:

1. An airbag apparatus, which is incorporated in a steering wheel that is rotated about a steering shaft having a longitudinal direction, the airbag apparatus comprising:
   a bag holder supported by the steering wheel;
   an airbag having an opening and a peripheral portion surrounding the opening, the airbag being located rearward of the bag holder in the longitudinal direction;
   an inflator that is elastically supported by the bag holder with an elastic support portion, the inflator being adapted for supplying gas into the airbag to inflate the airbag; and
   a retainer that includes an annular bag attachment portion having an inner rim, wherein the retainer is fastened to the bag holder at the bag attachment portion such that the peripheral portion of the airbag is held between the bag attachment portion and the bag holder,
   wherein the retainer further includes:
      an arch portion that extends rearward in the longitudinal direction from the inner rim of the bag attachment portion, the arch portion surrounding the inflator from outside in a radial direction of the steering shaft; and a bag encompassing portion that extends inward in the radial direction from the inner rim of the bag attachment portion, the bag encompassing portion encompassing the peripheral portion of the airbag, wherein the bag encompassing portion is located at least at a part of the inner rim of the bag attachment portion that is located at a position corresponding to a fastened portion where the bag attachment portion and the bag holder are fastened to each other, the arch portion is one of a plurality of arch portions, which are circumferentially arranged while being separated from one another, the bag attachment portion is fastened to the bag holder at a position between an adjacent pair of the arch portions, the bag encompassing portion is one of a plurality of bag encompassing portions, and the bag encompassing portions are arranged substantially in all areas of the inner rim of the bag attachment portion that are each located between an adjacent pair of the arch portions.

2. An airbag apparatus, which is incorporated in a steering wheel that is rotated about a steering shaft having a longitudinal direction, the airbag apparatus comprising:

a bag holder supported by the steering wheel;

an airbag having an opening and a peripheral portion surrounding the opening, the airbag being located rearward of the bag holder in the longitudinal direction;

an inflator that is elastically supported by the bag holder with an elastic support portion, the inflator being adapted for supplying gas into the airbag to inflate the airbag; and a retainer that includes an annular bag attachment portion having an inner rim, wherein the retainer is fastened to the bag holder at the bag attachment portion such that the peripheral portion of the airbag is held between the bag attachment portion and the bag holder, wherein the retainer further includes:

an arch portion that extends rearward in the longitudinal direction from the inner rim of the bag attachment portion, the arch portion surrounding the inflator from outside in a radial direction of the steering shaft; and a bag encompassing portion that extends inward in the radial direction from the inner rim of the bag attachment portion, the bag encompassing portion encompassing the peripheral portion of the airbag, wherein the arch portion is one of a plurality of arch portions, which are circumferentially arranged while being separated from one another, the bag encompassing portion is one of a plurality of bag encompassing portions, and the bag encompassing portions are arranged substantially in all areas of the inner rim of the bag attachment portion that are each located between an adjacent pair of the arch portions.

* * * * *